United States Patent
Harvey et al.

(10) Patent No.: US 11,631,879 B2
(45) Date of Patent: Apr. 18, 2023

(54) FUEL CELL MODULE, FUEL CELL SYSTEM AND METHOD FOR PRODUCING A FUEL CELL MODULE

(71) Applicant: FCP Fuel Cell Powertrain GmbH, Chemnitz (DE)

(72) Inventors: David B. Harvey, Chemnitz (DE); Thomas Melczer, Chemnitz (DE)

(73) Assignee: FCP Fuel Cell Powertrain GmbH, Chemnitz (DE)

( * ) Notice: Subject to any disclaimer, the term of this patent is extended or adjusted under 35 U.S.C. 154(b) by 8 days.

(21) Appl. No.: 17/610,628

(22) PCT Filed: Jul. 15, 2020

(86) PCT No.: PCT/EP2020/070045
§ 371 (c)(1),
(2) Date: Nov. 11, 2021

(87) PCT Pub. No.: WO2021/009257
PCT Pub. Date: Jan. 21, 2021

(65) Prior Publication Data
US 2022/0149418 A1 May 12, 2022

(30) Foreign Application Priority Data
Jul. 16, 2019 (DE) .................... 10 2019 119 308.7

(51) Int. Cl.
*H01M 8/2475* (2016.01)
*H01M 8/248* (2016.01)
*H01M 8/249* (2016.01)
*H01M 8/04082* (2016.01)
*H01M 8/2485* (2016.01)

(52) U.S. Cl.
CPC ..... *H01M 8/2475* (2013.01); *H01M 8/04201* (2013.01); *H01M 8/248* (2013.01); *H01M 8/249* (2013.01); *H01M 8/2485* (2013.01)

(58) Field of Classification Search
CPC ........... H01M 8/2475; H01M 8/04201; H01M 8/248; H01M 8/2485; H01M 8/249; H01M 8/2404; Y02E 60/50
See application file for complete search history.

(56) References Cited

U.S. PATENT DOCUMENTS

| | | | | |
|---|---|---|---|---|
| 9,112,218 | B2* | 8/2015 | Shong | H01M 8/0282 |
| 2005/0202304 | A1* | 9/2005 | Peace | H01M 8/248 |
| | | | | 429/511 |
| 2011/0123903 | A1* | 5/2011 | Trenkler | H01M 8/2465 |
| | | | | 429/508 |
| 2013/0273452 | A1* | 10/2013 | Barton | C01B 3/065 |
| | | | | 429/469 |
| 2013/0337364 | A1* | 12/2013 | Burmeister | H01M 8/247 |
| | | | | 429/469 |
| 2016/0141700 | A1* | 5/2016 | Takeyama | H01M 8/2475 |
| | | | | 429/470 |
| 2016/0285124 | A1* | 9/2016 | Martinchek | H01M 8/2404 |
| 2018/0331385 | A1* | 11/2018 | Hickey | H01M 8/0625 |

FOREIGN PATENT DOCUMENTS

| | | |
|---|---|---|
| EP | 1 512 192 | 3/2005 |
| WO | 03/083977 | 10/2003 |
| WO | 2013/134789 | 9/2013 |

OTHER PUBLICATIONS

International Search Report for International Application No. PCT/EP2020/070045 dated Oct. 8, 2020.
International Preliminary Report on Patentability for International Application No. PCT/EP2020/070045 dated Oct. 18, 2020.

* cited by examiner

*Primary Examiner* — Muhammad S Siddiquee
(74) *Attorney, Agent, or Firm* — Warner Norcross + Judd LLP

(57) ABSTRACT

The invention relates to a fuel cell module (10) having a plurality of fuel cells forming a fuel cell stack and having an enclosure (14) which surrounds the fuel cell stack. The enclosure (14) includes a bottom assembly and a lid cap assembly (30), wherein the bottom assembly includes a jacket at least partly form-fitted to the stack architecture providing internal alignment functions and a bottom plate in pressure contact with the fuel cell stack, wherein the lid cap assembly (30) comprises a compression plate (32) in pressure contact with the fuel cell stack. The bottom assembly (20) and the lid cap assembly (30) are provided with a progressive locking system providing a range of compression pressures to the fuel cell module (10). Further aspects of the invention relate to a fuel cell system and to a method for producing a fuel cell module (10).

14 Claims, 19 Drawing Sheets

FUEL CELL MODULE, FUEL CELL SYSTEM AND METHOD FOR PRODUCING A FUEL CELL MODULE

INTRODUCTION

The present invention relates generally to fuel cell modules and fuel cell systems which include a number of fuel cell modules.

Packaging and integration are one of the key challenges in the deployment of the state-of-the-art fuel cell stacks and systems. Conventional or state-of-the-art stack technology employs a configuration which includes a MEA sandwiched between a pair of bipolar flow field plates; which for one skilled in the art, is commonly referred to as the unit cell. The unit cell is then stacked in a series to form an assembly of unit cells. This assembly of unit cells is then sandwiched between a set of compression hardware and a media plate, or in some cases a compression hardware with an integrated media plate, in order to form the fuel cell stack. The assembly of this unit can present challenges in high volume manufacturing due to alignment of the individual parts and the ability to the hold the alignment during the affixation of the media plate and compression hardware depending on the number of unit cells determined for the final stack configuration.

SUMMARY OF THE INVENTION

According to a first aspect, a fuel cell module is proposed having a plurality of fuel cells forming a fuel cell stack. The fuel cell module includes an enclosure which surrounds the fuel cell stack. The enclosure includes a bottom assembly and a lid cap assembly. In some embodiments, the enclosure is box shaped. The bottom assembly includes a jacket which is at least partly form-fitted to the stack architecture providing internal alignment functions and a bottom plate in pressure contact with the fuel cell stack. The lid cap assembly comprises a compression plate in pressure contact with the fuel cell stack. In some embodiments the lid cap assembly comprises media routing elements. The bottom assembly and lid cap assembly are provided with a progressive locking system providing a range of compression pressures to the fuel cell module.

In the context of the present disclosure, the enclosure with the progressive locking system may also be called "lunchbox" enclosure.

In order to simplify and reduce the cost of the overall stack assembly, a novel enclosure is proposed. In one embodiment, the enclosure consists of a bottom formed assembly that is form fitted to the stack architecture providing internal alignment functions.

The fixation of the assembly can be done, as in one embodiment, with the progressive locking system in which the locking steps are chosen to provide a range of compression pressures. In some embodiments, the progressive locking system provides for several locking steps. The several locking steps comprise least one locking step providing pre-compression, i.e. less than full compression, and at least one other locking step providing full compression to the fuel cell stack.

Full compression may be defined as a compression, wherein the contact resistance of the individual fuel cells and the fuel cell module is minimized. At full compression, the performance of the fuel cell stack typically shows a maximum value in voltage, if considered over the range of applied compression pressure. Full compression may typically refer to a value 0.2 MPa to 2 MPa.

A pre-compression may be defined as a compression level in which the stack is leak tight from a hydrogen gas basis. In the context of the present disclosure, a pre-compression may amount to a fraction of the full compression, e.g. a value between 5% and 120%. Typically, a pre-compression may be a value between 5% and 30%. A pressure above 100% of full compression may also be set as a pre-compression, in particular during stocking and transport.

During use, when the chemical reaction takes place, the fuel cell stack is subject to swelling, e.g., due to the production of $H_2O$, and requires more volume in the stacking direction. The term "stacking direction" means a direction orthogonal to the main dimensions of the stack elements, which may include the bipolar plates and the MEAs. The stack height and the number of stack elements refers to stacking direction. The stacking direction equals to the direction in which the bottom assembly and the lid cap assembly are nested. Relative movement of bottom assembly and lid cap assembly towards or away from each other may happen in stacking direction. In some embodiments, the progressive locking system provides for an upbuilding of restoring forces between the bottom assembly and the lid cap assembly when the fuel cell stack grows during use. The physical conditions for the chemical reaction can thus be kept constant in the fuel cell stack even if the volume grows.

Similarly, in cases when temperatures vary from −30° C. to 80° C., depending on the environment and taking start-up and operation modes of the fuel cell module into account, the fuel cell stack may expand and contract within the enclosure. The enclosure allows for lateral expansion and contraction of the fuel cell stack which serves to allow the compression pressure of the fuel cell stack to remain consistent and to reduce the mechanical stress of the fuel cell stack that would otherwise accompany the thermal expansion.

Internally, in one embodiment, the bottom assembly, for example the lower fixation plate, may accommodate displacement to allow the compression pressure of the stack to remain consistent while the stack assembly grows and shrinks based on various physical phenomena familiar to an individual skilled in the art.

In some embodiments, the lid cap assembly includes a circumferential jacket section for a form-fitted engagement with the jacket. In some embodiments, the progressive locking system comprises first locking elements formed at the jacket section. The first locking elements may include spring elements, ratcheting elements or the like.

A second component of the enclosure is thus the lid cap assembly which is also understood as a lid cap system in the context of the present disclosure. The lid cap system has an embossed integrated compression plate and, in some embodiments, a partial jacket. The compression plate, in some embodiments, or the jacket, in alternate embodiments, contains a locking system that will result in the bottom enclosure jacket locking into the top lid cap system. The lid cap system will follow the alignment guides of the external jacket and additionally may provide its own additional alignment guides during joining.

In some embodiments, the progressive locking system comprises a spring structure, preferably a leaf spring structure, engaging a ratchet bar. In one embodiment, the spring structure, preferably leaf spring structure, is provided at the lid cap assembly and the ratchet bar is provided at the jacket. Alternatively, the spring structure, preferably leaf spring structure, may be provided at the lid cap assembly and the ratchet bar may be provided at the jacket.

The leaf spring structure may be comprised of at least one leaf spring. In some embodiments, the leaf spring structure comprises several leaf springs arranged in a chain. The leaf spring structure may be shaped as a fish skeleton, the leaf springs being shaped like fishbones.

In one embodiment, the spring structure, preferably leaf spring structure, is arranged on or fixated to a slider providing the ability of adjusting compression pressures to the fuel cell module. In an alternative embodiment, the ratchet bar is arranged on a slider providing the ability of adjusting compression pressures to the fuel cell module. Linear movement of the slider may enable the adjustable positioning of jacket and lid cap assembly relative to each other, thus allowing a range of compression pressures of the enclosure.

In one embodiment the ratchet bar includes a number of protrusions having sliding portions. A displacement of the lid cap assembly with regards to the bottom assembly translates into a sliding movement of at least one leaf spring of the leaf spring structure over a sliding portion. Sliding of the leaf springs in one direction leads to the upbuilding of restoring forces. Sliding of the leaf springs in the other direction leads to the reduction of restoring forces. Due to spring force of the leaf spring structure, a pressure self-adjusting enclosure is thus provided.

In an alternative embodiment, the progressive locking system comprises a spring assembly provided at one of the lid cap assembly and the jacket. The spring assembly engages a first rail provided at the other one of the lid cap assembly and the jacket. The spring assembly engaging the first rail provides for linear movement between the jacket and the lid cap assembly, enabling thus the relative positioning of jacket and lid cap assembly with respect to each other, thus allowing a range of compression pressures of the enclosure. Due to spring force, the pressure self-adjusting enclosure is provided.

In one embodiment, the jacket has a rectangular cross section with pockets. Particularly, there may be one pocket on each longer side of the jacket of the bottom assembly. The pockets provide a space for housing the progressive locking system. The jacket section of the lid cap assembly may have a regular rectangular cross section. The locking system may thus be sandwiched between the jacket and the jacket section of the lid cap in the pockets.

In some embodiments, the jacket provides for at least three, preferably at least four alignment regions for stack alignment during assembling. At least one, preferably two, three or four of these alignment regions may form mounting through holes for the connection of the fuel cell module to an external support structure. Thus, the alignment regions used during assembling may have a second function as holes for the assembly to the support structure.

In one embodiment, humidification means, sensors and/or controllers for monitoring the operation of the fuel cell module and/or power conversion devices are integrated into the enclosure.

Internally; either the bottom mounting plate or the top lid cap, or both, contain media pathways to connect the hydrogen, air, and cooling fluid from the exterior media interface of the enclosure to the collection of unit cells within. The media ports and interfaces within may, in one embodiment be designed in a way so as to provide locating overlap in order to minimize the tolerance alignment issues that arise during stack assembly.

The external media interfaces will be centralized at or distributed around the cell enclosure.

In one embodiment, the enclosure is box shaped. The lid cap assembly comprises external connection means for supply and evacuation of compressed air, reactants and coolant to the fuel cell module. The external connection means may be arranged at the same side of the box shaped enclosure. The fuel cell stack may be further connected to current collector tabs which may exit the enclosure at the same side as the external connection means.

The centralization of the external media interfaces, in one embodiment, will be done to allow for the connection of the assembled "lunch box" enclosure to an integrated media backplane which allows for the connection of multi-"lunch box" enclosures into a common set of manifolding for hydrogen, air, and cooling, fixed mounting locations, and common power collection. Power collection in one embodiment can be done through a common bus, while in another embodiment is done through a series of separate buses connected to a power conversion device integrated into or separately mounted with the backplane.

In an alternative embodiment, the media interface on the enclosures are designed in a manner such that the enclosures fit together, like Lego blocks, and their linkage forms an integrated media backplane. Each enclosure may include integration of passive humidification, exterior jacket circulating coolant flow, integration of power conversion devices tailored to the power level of the individual power of the individual stack within the enclosure, and independent fuel cell controllers which are multi-unit capable. When the connections are formed enclosure to enclosure, the media routing within the enclosure can be configured to be in a cascade format or alternately as a manifold with parallel connections to each of the stacks enclosed within the individual enclosure units.

The proposed solution allows for a minimization of piping and connectors, improves serviceability of the system, provides a more compact and simplified packaging for the stack, and allows for stable pre-compression of the stack prior to final full compression done prior to commissioning.

According to another aspect of the invention, a fuel cell system having at least one, preferably from 2 to 20 fuel cell modules is proposed, wherein the fuel cell modules are provided as described above. The fuel cell modules are connected to an integration backplane having a distribution system for the supply and evacuation of compressed air, reactants and coolant to the fuel cell modules. The integration backplane may also provide current collection of the fuel cell modules.

Thus, a modular, scalable low-cost fuel cell system which can be adapted from power levels as low as 1 kW or 2.5 kW or 10 kW up to, and potentially higher than, 600 kW a simplified modular connection system is also provided.

Based on the "lunchbox" fuel cell module concept described above, an integration backplane is proposed. The integration backplane or integrated backplane may be understood as a support structure in the context of the present disclosure.

The integrated backplane provides a plug-in type concept where the "lunchbox" enclosures are plugged into the media couplings of the integrated backplane. The integrated backplane includes an integrated air and coolant pathway; and in some embodiments an integrated hydrogen pathway.

The backplane can be one entire unit or it, itself, can be assembled in modules that scale the number of possible module connections. The backplane shall provide the incoming flow for air and coolant and the collection and extraction of the used flows to an interface exiting the backplane either to the ambient environment or to other sub-system which the fuel cell system must be connected to, such as a vehicle radiator.

In one embodiment, as the incoming and exiting air flows are contained within the integrated backplane, the backplane may contain an integrated humidifier or a series of integrated humidifiers. These integrated humidifier(s) will work according to their physical principals and be integrated to ensure that these functions are met which is well understood by a person skilled in the art.

The backplane will include mounting points for integration into the vehicle chassis and in some embodiments the backplane will include a coupling interface at which the compressor, coolant pump/radiator outlet, and/or hydrogen tank outlet/low pressure regulation valve can be connected.

In some embodiments, the compressor inputs can be directly on the back nearest the modules where the compressor can in some embodiments be directly integrated on the backplane. In all embodiments, the number of compressors can be a few as one or be up to twice the number of integrated modules.

The hydrogen supply connections can be done by a central manifold with the modules connected by fixed ports and also, in some embodiments, by a central manifold with the modules connected by hoses either rigid or flexible.

The integrated backplane may include an integrated bus system which is used to connect all of the individual modules together and, in alternate embodiments, a power conversion device may be integrated directly into the backplane such that the power conversion device takes input from each module and power balances between them.

Each module within the backplane can have a central controller unit or, in some embodiments, a single controller unit can be integrated into the backplane with a subcontroller integrated into the sub-modules that provides the functionality of expandability and adaptability as new modules are introduced.

The integrated backplane can be laid out in a planar layout with the back placed in any orientation.

In all embodiments, the orientation of the stack can be adapted such that the orientation of the individual modules can be adjusted such that the most desirable orientation with the direction of the force of gravity is achieved.

In all embodiments, the connections between the individual modules and the backplane are affixed such that the length of tubing and/or direct connections are minimized in order to minimize the pressure losses within the total system.

The module controllers, and in some embodiments, the integrated controller within the backplane can be configured to either load balance amongst the modules are to selectively activate and deactivate specific modules, with the latter methodology combined in some embodiments with a flow bypass to avert flow within the module when deactivated, such that the overall performance and durability of each module can be maximized.

According to another aspect of the invention, a method for producing a fuel cell module is proposed. The method comprises the following steps:
stacking a multitude of MEA units and bipolar plates on a moveable center mounting plate surrounded by a jacket, the movable center mounting plate providing motion so that the jacket provides alignment during the stacking,
raising the jacket or lowering the center mounting plate as the height of the stacked MEA units and bipolar plates increases during the assembly process,
locking the center mounting plate in position when it meets fixation points with the aligning jacket, the center mounting plate and the jacket thus forming a bottom assembly, and
joining a lid cap assembly to the bottom assembly via a progressive locking system to form an enclosure surrounding the fuel cell stack.

Typically, end plates for current collection may be stacked and will form top and bottom of the stack.

The term MEA unit means a one or more bonded or non-bonded elements from which the MEA (membrane electrode assembly) is formed. The MEA may comprise one or more layers including a first gas diffusion layer (GDL), an anode, an anode catalyst, a polymer membrane (PM), cathode catalyst, a cathode and a second gas diffusion layer (GDL). Typically, the MEA will include all of these layers, and the pre-assembled MEA is also understood as a "MEA unit" in the context of the present invention. The invention is by no means restricted to any type of fuel cell.

Thus, the stacking of the MEA units may involve a single method step if, e.g., a pre-assembled MEA is stacked. It may involve several steps if the individual elements from the MEA are stacked one after another.

The center mounting plate after fixation with the jacket forms the bottom plate of the bottom assembly.

In some embodiments, the center mounting plate, during assembling, provides motion so that the exterior jacket of the enclosure provides alignment during the stack assembly and the jacket is raised as the stack height increases during the assembly process. Upon reaching full height, the bottom plate meets the fixation points with the aligning exterior jacket and lock in position.

Thus, every MEA unit or bipolar plate can be positioned at the same place. This ensures that the current MEA unit or bipolar plate can be positioned exactly flat on the previous plate, e.g. by robots or robot arms. Assembling time is less than if the robot arm were to fill the stack elements from the bottom of the bottom assembly to the top of the bottom assembly. It is furthermore of advantage that the process can be easily automatically controlled by visual inspection as well as by cameras and the like.

In one embodiment, upon joining the lid cap assembly to the bottom assembly, a pre-compression in the form of a clamping force is applied to the progressive locking system to fix the stacked assembly at a lower-than-final compression pressure. Upon joining, thus, the lid cap system will, through the locking system, be inserted or join with the bottom jacket such that a small amount of pre-compression is applied to fix the entire stacked assembly in place; this pressure will not be the final fuel cell pressure but only a stabilizing clamping force which is used to hold the alignment and maintain the stack stability for the purposes of pre-assembly and storage of assembled enclosures until the desired time of use.

The method is understood to produce the fuel cell module described above. Therefore, it shall be understood that the features disclosed with regards to the fuel cell module are also disclosed with regards to the method and vice versa.

FURTHER ASPECTS OF THE PRESENT DISCLOSURE

In state-of-the-art fuel cell systems, traditional control architectures rely on the use of an array of sensors located in the air, hydrogen, humidification, and cooling loops. Further sensors are also included for monitoring the stack and these sensors are either integrated within the stack or located on the exterior of the stack components. All of these sensors are then used in combination with a control computer which takes the input values from the sensors and uses either empirical or semi-empirical models or a series of pre-loaded lookup tables in order to determine the appropriate input response to the controllers within the fuel cell system which regulate the incoming flow of hydrogen, air, coolant, or humidification of the incoming reactant streams.

This state-of-the-art fuel cell control architecture in general is costly due to the high number of sensors within the system and also very rigid in that it lacks adaptability in addressing operational conditions that are outside of the pre-determined boundaries of the programming. Additionally, there is a cost of development burden for systems of this traditional type of architecture as they require significant effort, time, and test articles in order to characterize the extents of the stack operation under the widest range of potential operating scenarios which might be expected to be encountered by the fuel cell system.

In order to address the shortcomings of the state-of-the-art approaches for fuel cell system control architectures while also reducing the overall cost of the fuel cell system—a self-learning, artificial intelligence-based Fuel Cell Control System is proposed. This system eliminates the vast majority of sensors thereby reducing cost and introduces the use of a self-learning, artificial intelligence algorithm to provide a high degree of adaptability and optimization based directly on the operating environment and requested duty cycle that the fuel cell system is subjected to.

The ability to control the system and provide input to the air, hydrogen, and cooling loop regulating controllers is still required. In order to provide the control capability, low cost voltage monitoring is implemented into the stack.

The integrated voltage monitoring may be done through the use of a low cost metal pin type connector integrated into a slot on the plate, while in another it is accomplished through the integration of a wireless sensor or RFID tag integrated into the flow field plate, and, in yet another method, it is accomplished through the use of a roll-on voltage sensor affixed to the stack exterior edge via an adhesive where the voltage sensing is accomplished either through measurements of the external field or through direct contact with the conducting materials.

To further enable the self-learning, artificially intelligent control architecture; a high frequency measurement capable device may be integrated into the control board or DC-DC converter for the system. The high frequency measurement capable device allows the in-situ collection of the frequency response spectra related to the hydration of the materials within the stack.

In the operation of a fuel cell, understanding the input and response behavior is critical and in the state-of-the-art this is accomplished through the use of many sensors and a series of underlying models and/or look-up. However, the most direct response for the state of the stack and the individual cell therein is in fact the stack and cell voltages, respectively. The stack and cell voltages provide a direct one-to-one response to the current operating conditions or duty-cycle in which the fuel cell stack is operating; however, based on the complexity in the underlying physics, the ability to interpret the response is significantly complicated and not easily deconvoluted.

In order to achieve the reduction or elimination of the sensor within the system and enable a self-learning, artificially intelligent control system the knowledge of the cell voltage, overall stack voltage, and the current state of hydration in the stack is needed. Using the description outlined above for the collection of cell-based voltages and the high frequency resistance, a control algorithm for the self-learning, artificially intelligent control architecture is proposed.

Specifically, the use of different waves forms on the control side can be used to perturbate the input signals to the individual controllers for the air, hydrogen, cooling, and humidification (if included) loops. This perturbation can be done individually on the respective loops or simultaneously on all loops but using a different perturbation frequency. During the control perturbation of the loops, the cell voltage, stack voltage, and high frequency response will be collected. The response of the cell voltage and stack voltage is then used to determine whether the response is positive in improving the performance or negative by reducing the performance.

The collection of the high frequency resistance is used to determine the state of hydration connected with the set operating points such that the system hydration can be controlled to prevent dry-out and flooding. Additionally, the state of hydration can be used in combination with the cell voltage to tailor operating conditions during startup and shutdown for conditions such as sub-zero operation.

Based on the individual improvement or collective improvement, the direction of optimal perturbation is obtained and the process repeated in order for the system to settle into the optimal configuration point for that set of operating demands and conditions.

Further, various forms of global optimization and local optimization algorithms, that are common for those skilled in the art, can be applied in order to accomplish the same perturbation-based optimization. As the optimization is completed, the artificially intelligent system tracks and monitors the operating points, the set conditions, and the resulting optimal performance. This tracking includes storage locally within the fuel cell control unit and may also include the upload of such data to a central database or localized database for reference access by the fuel cell controller but also by other fuel cell controller units worldwide or regionally.

Through the use of the stored data, the artificially intelligent system can learn and apply the data to enhance the optimization over time, track and control the stack response over the course of aging in order to tailor the system loop input behavior thus maximizing stack lifetime, and minimizing the perturbations necessary around the core operating points which allows lighter duty monitoring and perturbation to be accomplished instead on the fringe boundary points.

Through the use of connectivity between units, whether directly or through cloud or through a centralized database; individual units can be optimized using the control algorithm response learned by the artificially intelligent controller of other units thus creating a collective or hive optimization either locally, regionally, or worldwide.

The use of the self-learning, artificially intelligent control system also provides an elimination or minimization of the factory acceptance testing and/or stack conditioning necessary in the field as the perturbation and learning algorithm is in essence an on the fly artificially intelligent optimization control unit. This allows the system to perform in field conditioning and control behavior based on the progressively changing cell response during the initial stack break-in or conditioning period. The elimination or minimization of stack factory acceptance testing and/or stack conditioning prior to deployment of the fuel cell stack to the desired application results in a significant reduction in the overall cost of the fuel cell system.

In some variants, the self-learning, artificial intelligent algorithm can be employed to either optimize performance or minimize the degradation rate; or in blended mode, optimize and balance both for a blended value-based optimization. Such that the learning algorithm can be tasked also with lifetime optimization through the selection of operating conditions which minimize the degradation rate per unit time on a cell-based and/or stack basis.

Every feature which is disclosed above in connection with one of the aforementioned "aspects" of the invention or disclosure is understood to be disclosed in connection with the other "aspects" of the invention or disclosure as well, and may be used in combination with other features from other "aspects" in accordance with the invention.

The invention and its features may be better understood with reference to the drawings. The following description of the drawings shall, however, not be understood as limiting the invention which is generally defined by the claims.

DESCRIPTION OF THE DRAWINGS

Figure 1:
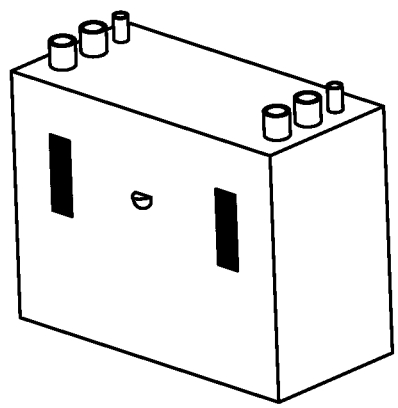
FIG. 1 is a perspective view of a lunchbox enclosure according to an embodiment of the invention.

Hereinafter, embodiments of the invention are described in greater detail with reference to the drawings. The embodiments are not to be interpreted as limiting the subject matter of the invention. Many modifications and combinations which are not shown in the drawings will be apparent to a person skilled in the art on the basis of his technical knowledge.

In the drawings, same reference signs are used to identify same elements or elements which are similar in their function. Repetitive statements are avoided, if possible.

FIG. 1 depicts a lunchbox enclosure with one set of possible embodiments for external ratcheting, porting and external electrical connections.

Figure 2:
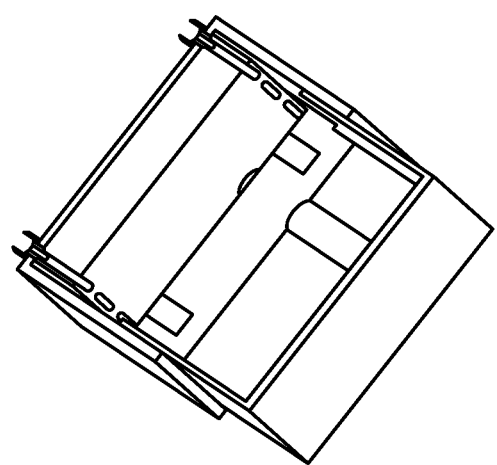
FIG. 2 is a cross section of a lunchbox enclosure according to an embodiment of the invention.

FIG. 2 depicts a cross section of a lunchbox enclosure showing one possible embodiment for the internal compression and porting block, alignment features for the stack assembly, and a port configuration for a U-flow arrangement.

Figure 3:
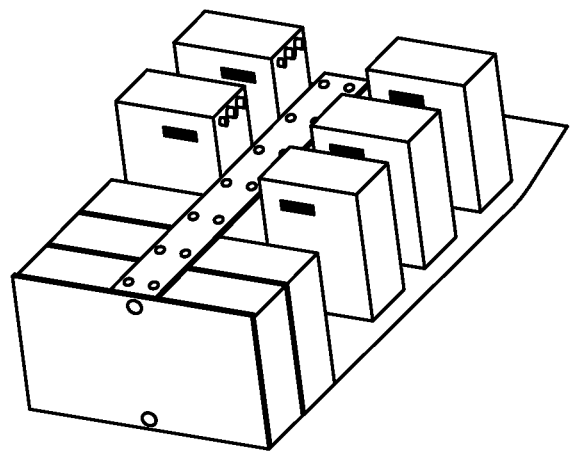
FIGS. 3 and 4 provide perspective views of a system with integrated backplane and lunchboxes arranged thereon.
Figure 4:
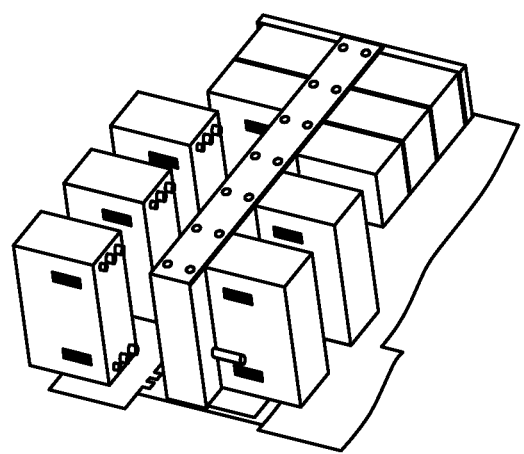

One embodiment of the stacking arrangement is shown in FIGS. 3 and 4. FIGS. 3 and 4 show front and back views of lunchbox arrangement and porting as the stacking and plug-in concept for the integrated backplane.

Figure 5:
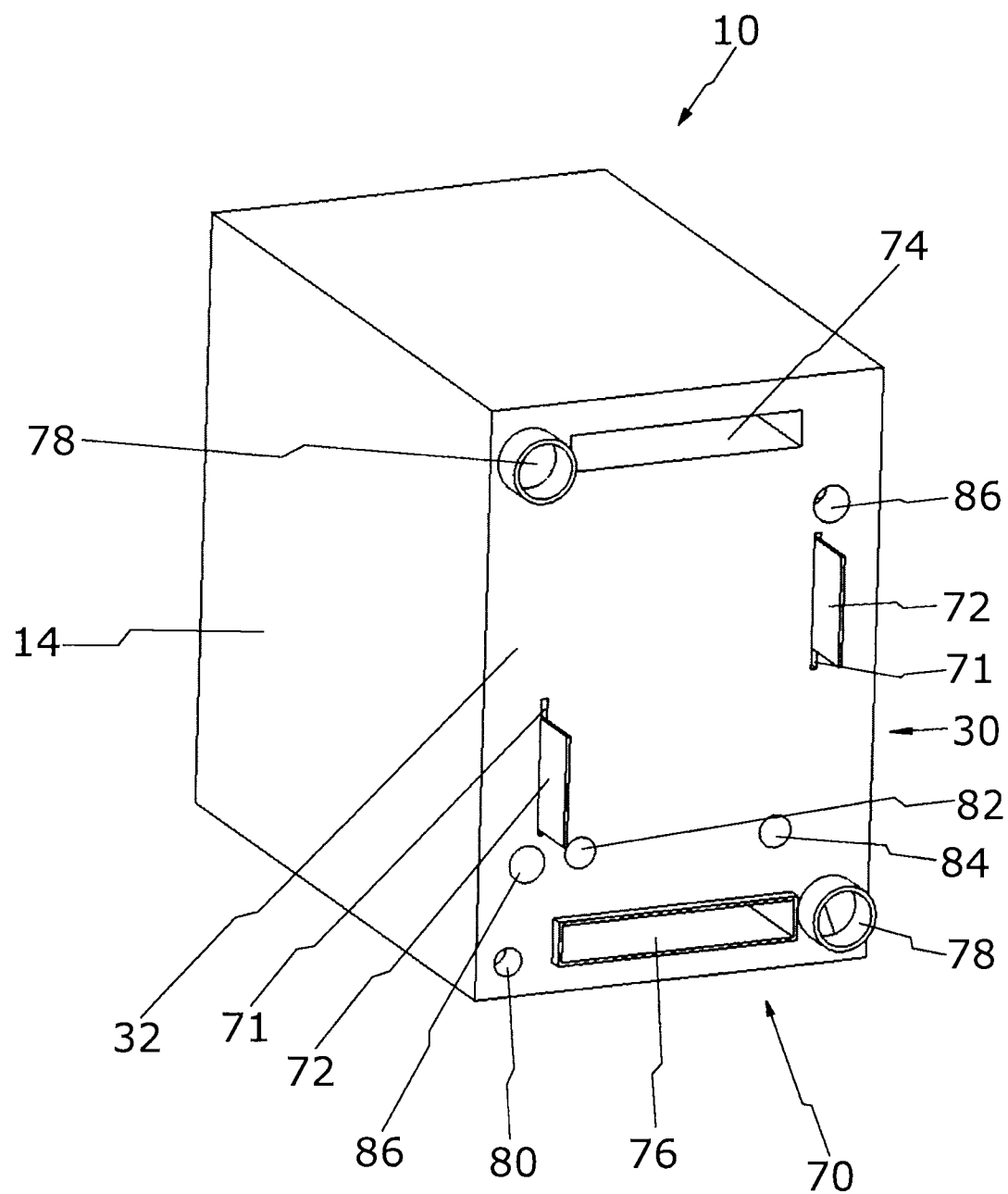
FIG. 5 is a perspective view of a fuel cell module according to an embodiment of the invention, with a lid cap assembly in the foreground.

FIG. 5 shows a fuel cell module 10 in perspective view. The displayed front side of the fuel cell module 10 is formed by a lid cap assembly 30, forming, together with a bottom assembly 20 not displayed, the enclosure 14 of the fuel cell module 10.

The fuel cell module 10, purely by way of example, is designed in a cuboid shape to enable space-saving and modular installation in an installation space, for example, a space for mounting a drive unit of a vehicle, such as a motor vehicle, bus, truck and the like.

Figure 6:
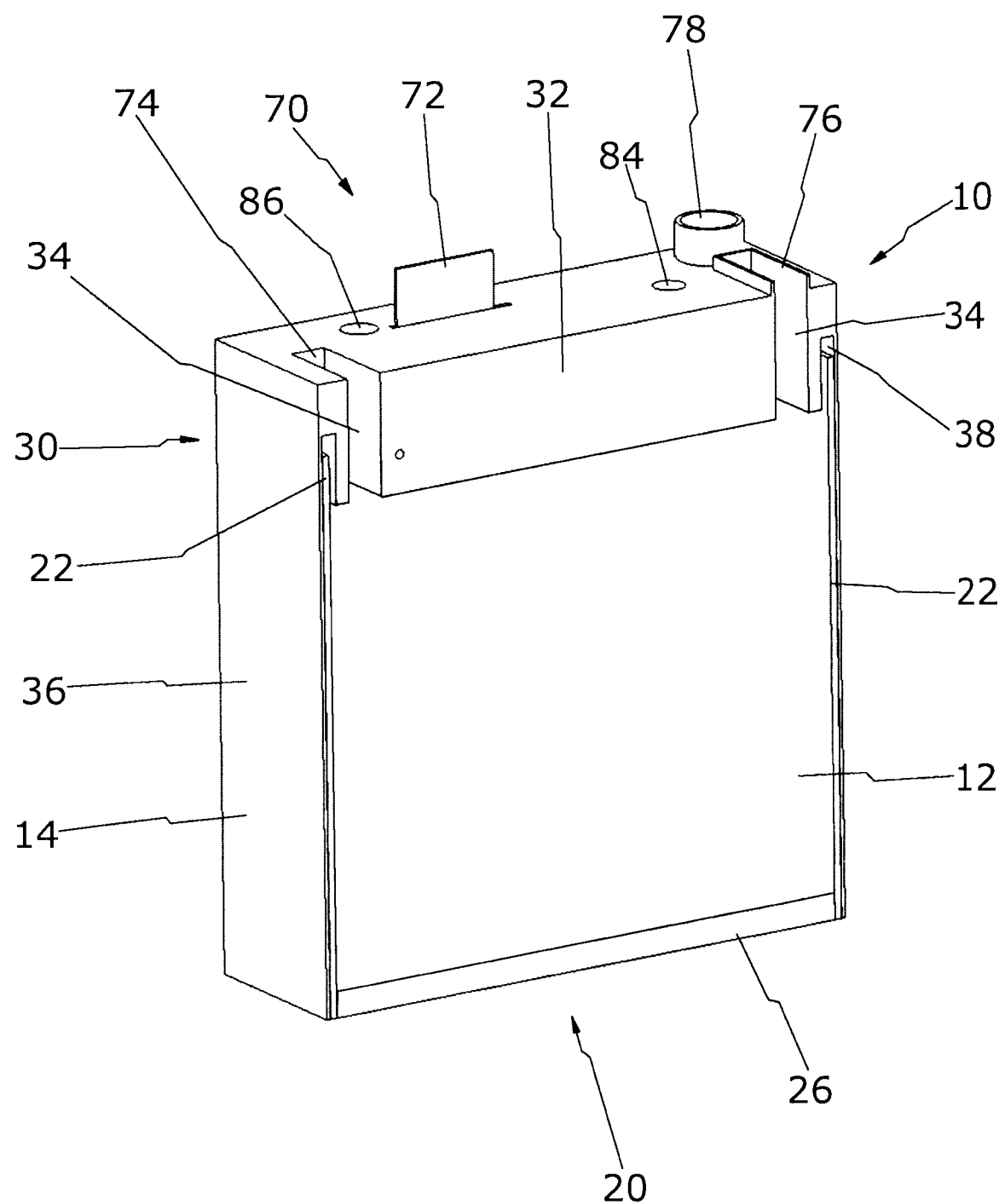
FIG. 6 is a section view of the fuel cell module of FIG. 5.
Figure 7:
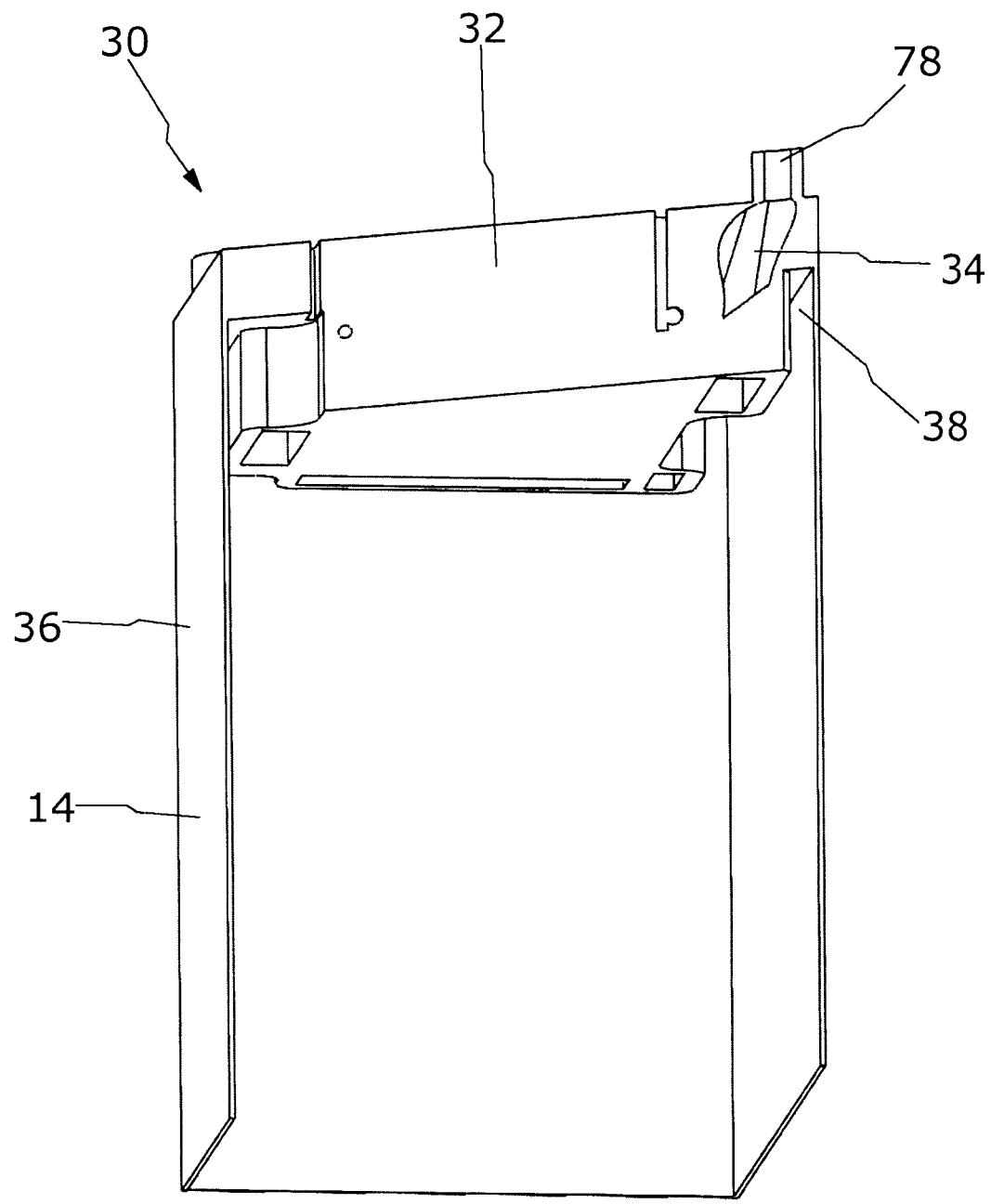
FIG. 7 is a section view of the lid cap assembly of the fuel cell module of FIG. 5.
Figure 8:
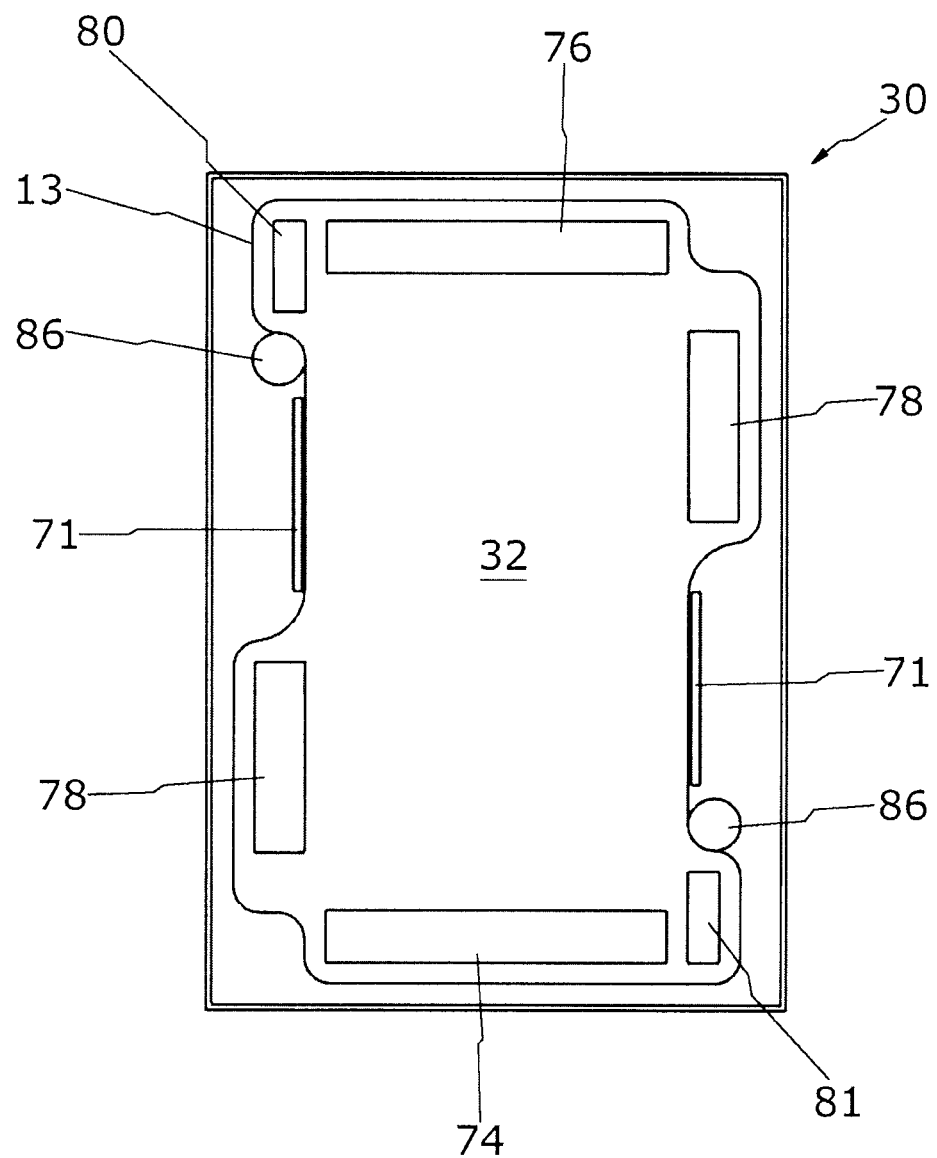
FIG. 8 is a section view at the level of the media manifolding region of the lid cap assembly of the fuel cell module of FIG. 5.

External connection means 70 are arranged on a single side of the cuboid fuel cell module 10, preferably at the side of a compression plate 32 described in more detail with regards to FIGS. 6-8. The arrangement of the external connection means 70 on the same side of the box shaped, purely exemplary, cuboid enclosure 14, is advantageously made possible by a plug-in connection to an integration backplane, which can, for example, supply and discharge compressed air, reactants and coolant to the fuel cell module(s).

In FIG. 5, the external connection means 70 include an oxidant inlet 74 and an oxidant outlet 76, which are, by way of example, formed here on two opposing sides to allow a U-shaped passage through the fuel cell module 10 or the fuel cell stack 12 therein (not shown).

The external connection means 70, for example, without limiting the invention, further include two coolant ports 78, which are located, for example, at two opposite corners of the front of the lid cap assembly 30 to allow a U-shaped passage of coolant through the fuel cell stack 12.

The external connection means 70 also include a fuel inlet 80, which, by way of example, is located in another corner of the front of the lid cap assembly 30, without limiting the invention. Reference numeral 82 shows an access window to an ejector valve, and reference numeral 84 shows an access window to a purge valve, which, in this exemplary embodiment, are also located at the front side of the lid cap assembly 30. The functions of ejector and purge valves as parts of the anode sub system of the fuel cell system are well known to the person skilled in the art and do not have to be described in more detail here.

Furthermore, current collector tabs 72 pass through respective though holes 71 in the front of the lid cap assembly 30, so that the connection to the integration backplane can simultaneously enable removal of the current.

At the front side of the lid cap assembly 30, two mounting through holes 86 are provided to fix the fuel cell module 10 to the integration backplane. In other embodiments, there may be more than two mounting through holes 86 present, e.g. three or four through holes 86. Instead of a mounting through hole 86, fixation means 68, such as bolts, screws and the like, can of course be there, which provide a mechanical connection to the integration backplane by means of a corresponding counterpart. It should also be understood that further elements may be provided at the fuel cell module 10 as well, especially centering means or alignment means and the like.

FIG. 6 shows a section through the fuel cell module 10 of FIG. 5, depicting the interior of the fuel cell module 10.

The enclosure 14 comprises the lid cap assembly 30 described with reference to FIG. 5 and a bottom assembly 20 nested in the lid cap assembly 30. The lid cap assembly 30 and the bottom assembly 20 are attached to each other by means of a locking system 16 not shown here. The locking system 16 will be described with reference to FIGS. 16 to 20. The lid cap assembly 30 and the bottom assembly 20 enclose a fuel cell stack 12, which is formed in a known manner from a multitude of membrane electrode assemblies (MEAs), bipolar plates and end plates. Details are known to the person skilled in the art. Typically, a bipolar plate connects two adjacent MEAs, with the negative electrical pole of the bipolar plate being located on the hydrogen side of a first MEA, and the positive electrical pole contacting the oxygen side of the other MEA. The arrangement of the bipolar plates and MEAs is repeated up to the end plates, which causes the voltages of the individual cells to add up.

In a preferred embodiment, fuel cell stacks 12 with bipolar plates are provided, as they typically require little space. Their high current density is also particularly advantageous. However, this is not to limit the invention. The fuel cell stack 12 can also include monopolar base units in which the individual cells are electrically connected to each other.

The bottom assembly 20 includes a jacket 22 with, for example, four circumferential side walls and a bottom plate 26, which functions as a first compression plate.

The lid cap assembly 30 includes a jacket section 36 with four circumferential side walls that surround the jacket 22 of the bottom assembly 20. The lid cap assembly 30 also includes a compression plate 32, which forms a media manifolding region as an additional function.

The compression plate 32 and the bottom plate 26 are arranged opposite each other. The bipolar plates and MEAs, or monopolar plates and MEAs, respectively, of the fuel cell stack 12 are arranged essentially parallel to the bottom plate 26 and the compression plate 32.

Movement towards each other of the lid cap assembly 30 and the bottom assembly 20 means a movement towards each other of the compression plate 32 towards the bottom plate 26. Movement towards each other of the compression plate 32 and the bottom plate 26 leads to a compression of the fuel cell stack 12. A spatial expansion of the fuel cell stack 12 leads accordingly in reverse direction to a movement away from each other of the compression plate 32 from the bottom plate 26. The height of the slot section 38 allows the bottom assembly 20 to be moved relative to the lid cap assembly 30. Various pressure conditions can thus be applied to the fuel cell stack 12. By accurately dimensioning and, in some embodiments, sealing the slot section 38, a loss of media over the joining surfaces of the bottom assembly 20 with the lid cap assembly 30 can be avoided.

The compression plate 32 also includes the external connection means 70 described with reference to FIG. 5, showing in a sectional view also one of the current collecting tabs 72, a coolant port 78, part of the oxidant inlet 74, and part of the oxidant outlet 76, as well as the purge valve access window 84 and mounting through hole 86. The compression plate 32 in this exemplary but not limiting embodiment is not fully massive or solid but contains media routing channels 34 for routing the media from external to internal, i.e. to fuel cell stack 12. The media routing channel 34 shown, for example, in FIG. 6 is assigned to the oxidant inlet 74 and the oxidant outlet 76, by way of example, running straight and vertical through the compression plate 32.

FIG. 7 shows a sectional view through the lid cap assembly 30 with further details of the compression plate 32. The compression plate 32 not only conducts the media through from the outside, but also enables media (fluid) beam splitting, widening or fanning, and precise routing, respectively, to the fuel cell stack 12, which is not shown here. This can be seen, merely as an example, at the coolant port 78, whose circular connection area on the outside of the pressure plate 32 is transferred to a widened area, here with a rectangular cross section, by way of example. The corresponding media distribution channel 34 is thus not provided with constant cross section across the height of the pressure plate 32.

FIG. 8 shows a top view from the inside, i.e. from the perspective of the fuel cell stack 12, which is not shown here, towards the compression plate 32. As already described, the lid cap assembly 30 has a rectangular layout. Reference number 13 shows a projected footprint of the fuel cell stack 12, which is encompassed by lid cap assembly 30.

On the inside, compression plate 32 has corresponding openings for the external connection means 70, and in this embodiment, the oxidant outlet 76 and the oxidant inlet 74 still have the same slot-like rectangular cross section as can be seen on the outside of enclosure 14, described with reference to FIG. 5. The coolant ports 78 have a rectangular cross section, which allows better distribution of the cooling fluid to the fuel cell stack 12. Externally, the coolant ports 78 are designed for hose connectors, as shown in FIG. 5. This allows the coolant to be supplying through hoses which are, for example arranged within the integration backplane. In addition, the slot-like openings for the current collector tabs 72 and the mounting through holes 86 for attachment to the integration backplane can also be seen in this view. Fuel inlet 80 and fuel outlet 81 are arranged in two corners of the compression plate 32.

Figure 9:
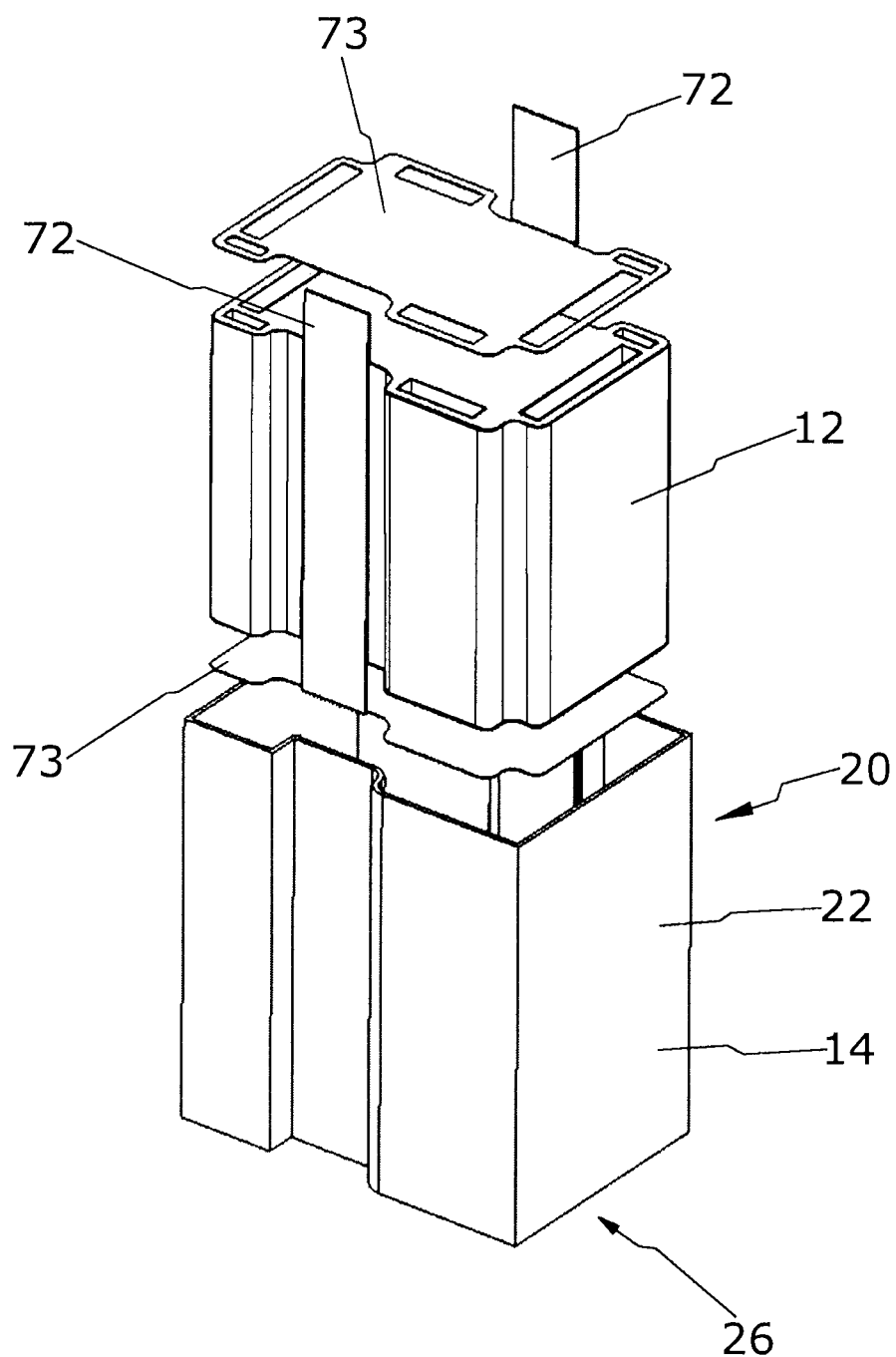
FIG. 9 is an exploded view of an assembly comprising the fuel cell stack, the current collection means and the bottom assembly of the fuel cell module of FIG. 5.

FIG. 9 shows an exploded view of the bottom assembly 20, the fuel cell stack 12 and associated end plates 73, which the current collector tabs 72 are welded to. The MEAs and bipolar plates of the fuel cell stack 12 typically run parallel to the end plates 73. One of the end plates 73 is located in the area of the bottom plate 26 of the bottom assembly 20, and another of the end plates 73 is located in the open top area of the bottom assembly 20, which is enclosed on top by the compression plate 32 of the lid cap assembly 30, as described with reference to FIG. 2. The current collector tabs 72 protrude upwards beyond the combined assembly, and they pass through the compression plate 32. The end plates 73 typically have the same lateral dimensions as the bipolar plates and MEAs. The shape of the bipolar plates and MEAs in stack 12 and the end plates 73 is essentially rectangular, but includes various recesses and through holes. The through holes provide for media routing, which is known to the skilled person. The recesses are designed to fit positively with the corresponding recesses in jacket 22 of the bottom assembly 20. The function of the recesses is explained in more detail below in relation to FIGS. 10 to 20.

Figure 10:
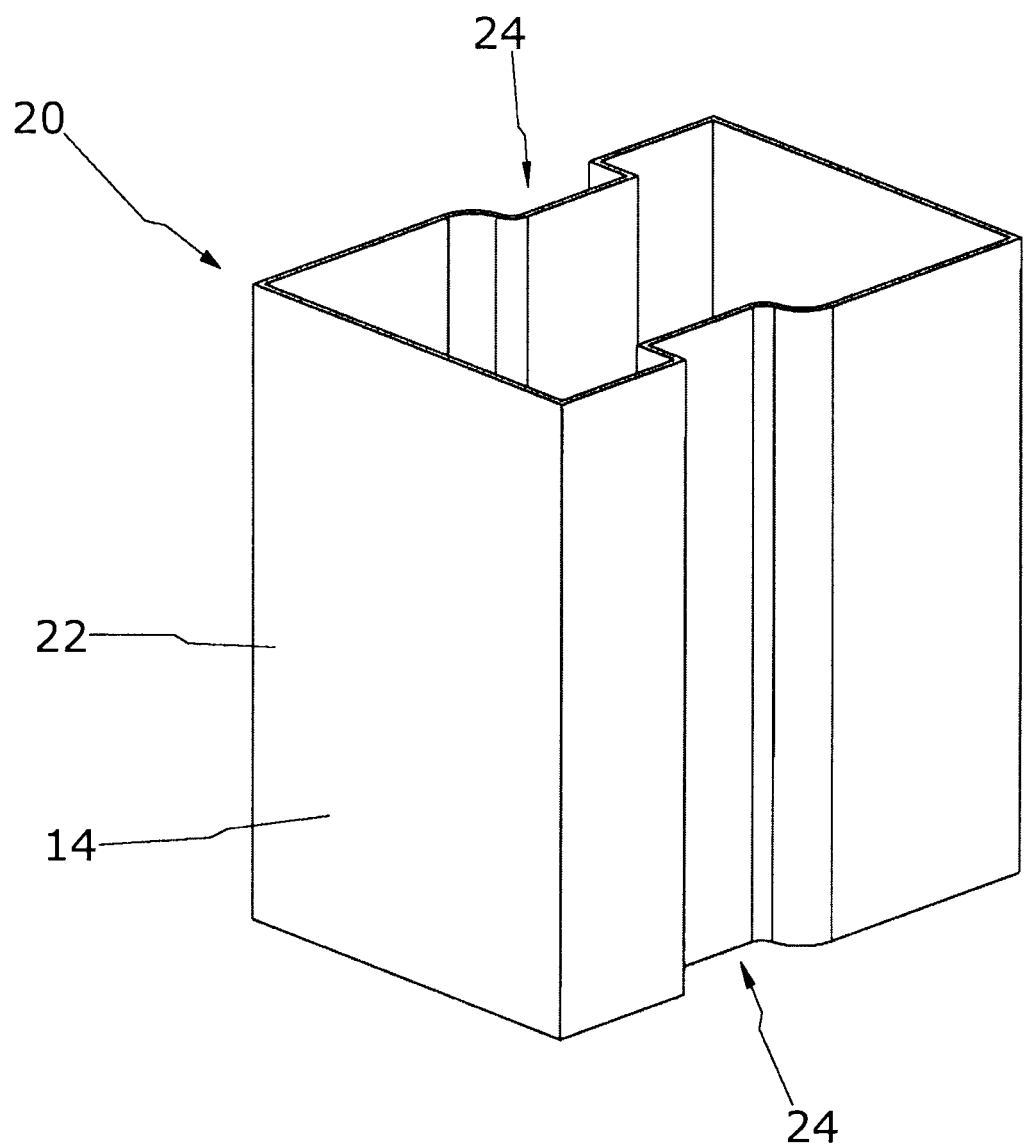
FIG. 10 is a perspective view of the bottom assembly of the fuel cell module of FIG. 5.

FIG. 10 shows a bottom assembly 20 in perspective view. The jacket 22 of the bottom assembly 20 has an essentially rectangular cross section, with two pockets 24 on its long side. The pockets 24 take up the rectangular cross section on the inside. The two pockets 24 in the embodiment shown here are purely exemplary without limiting the invention and are mirror-symmetrical with respect to a central axis through the bottom assembly 20. The pocket 24 runs evenly from the bottom to the top and is offset slightly away from the center. The pocket 24 provides housing for the locking system 16 described with reference to FIGS. 15 to 20, which is not shown here.

Figure 11:
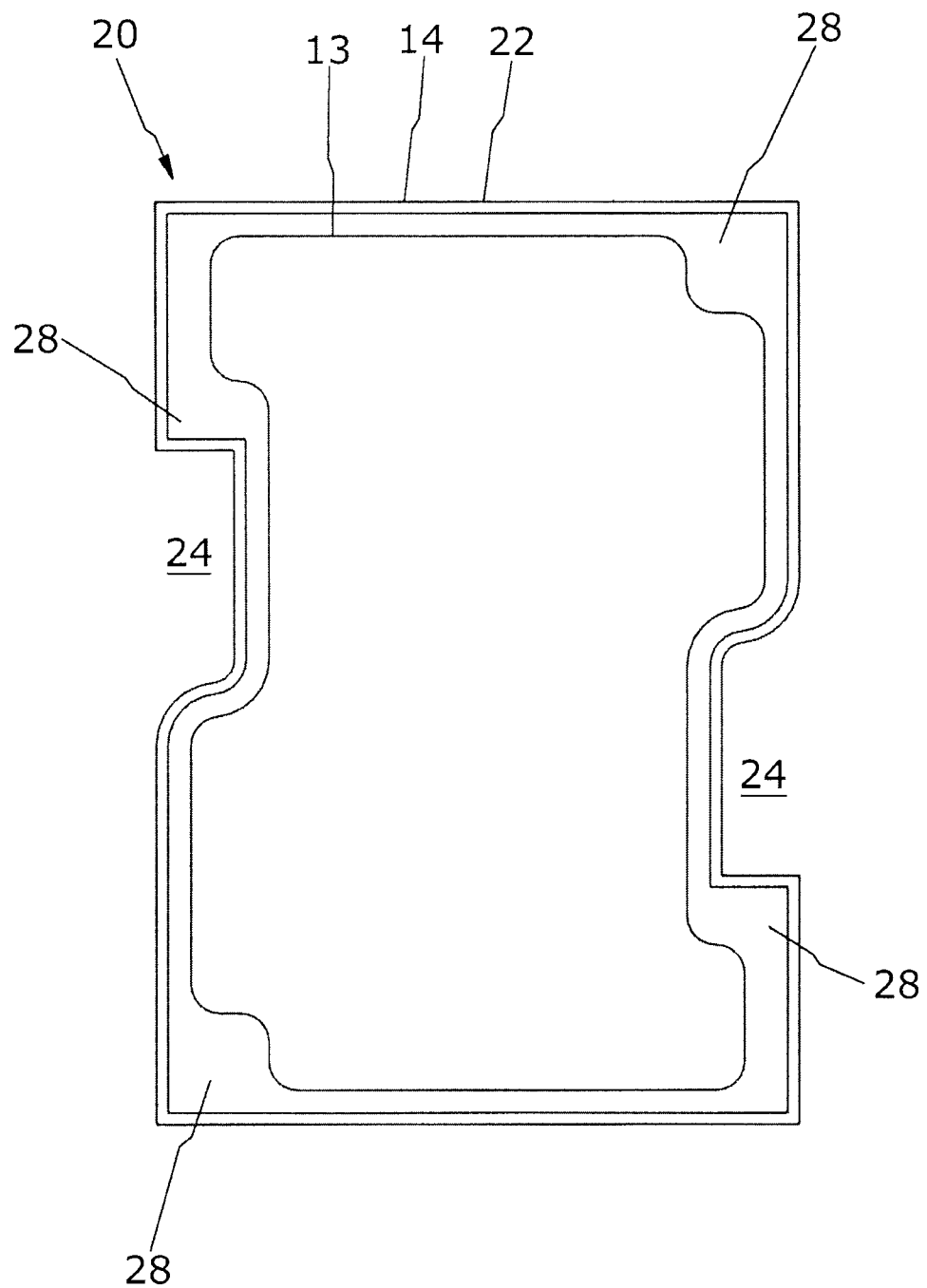
FIG. 11 is a top view of the bottom assembly of the fuel cell module of FIG. 5.

FIG. 11 shows a top view of the bottom assembly 20, with reference mark 13 showing the footprint of the fuel cell stack 12. The footprint 13 essentially follows the shape of the footprint of the jacket 22, thus including, in particular, the pockets 24. The bottom assembly 20 provides alignment functions and is essentially form fitted with the fuel cell stack 12. However, the footprint 13 of the fuel cell stack 12 and the shape of the jacket 22 differ in a number of alignment regions 28. In this embodiment there are four alignment regions 28, which, however, is not to be understood as limiting the invention. There may also be less or more, for example, 3, 5 or even more alignment regions 28. Just by way of example, two such alignment regions 28 are located in the corners of the jacket 22, and two more alignment regions 28 in the region of the pockets 24. In alternative embodiments, three or four alignment regions 28 can be located in the corners of the jacket 22, or three or four alignment regions 28 in the regions of the pockets 24. Alignment regions 28 are used for the precise placement of MEAs and bipolar plates to form the fuel cell stack 12. The alignment regions 28 can have a double function as channels for mounting elements to external structures, such as the integration backplane.

Figure 12:
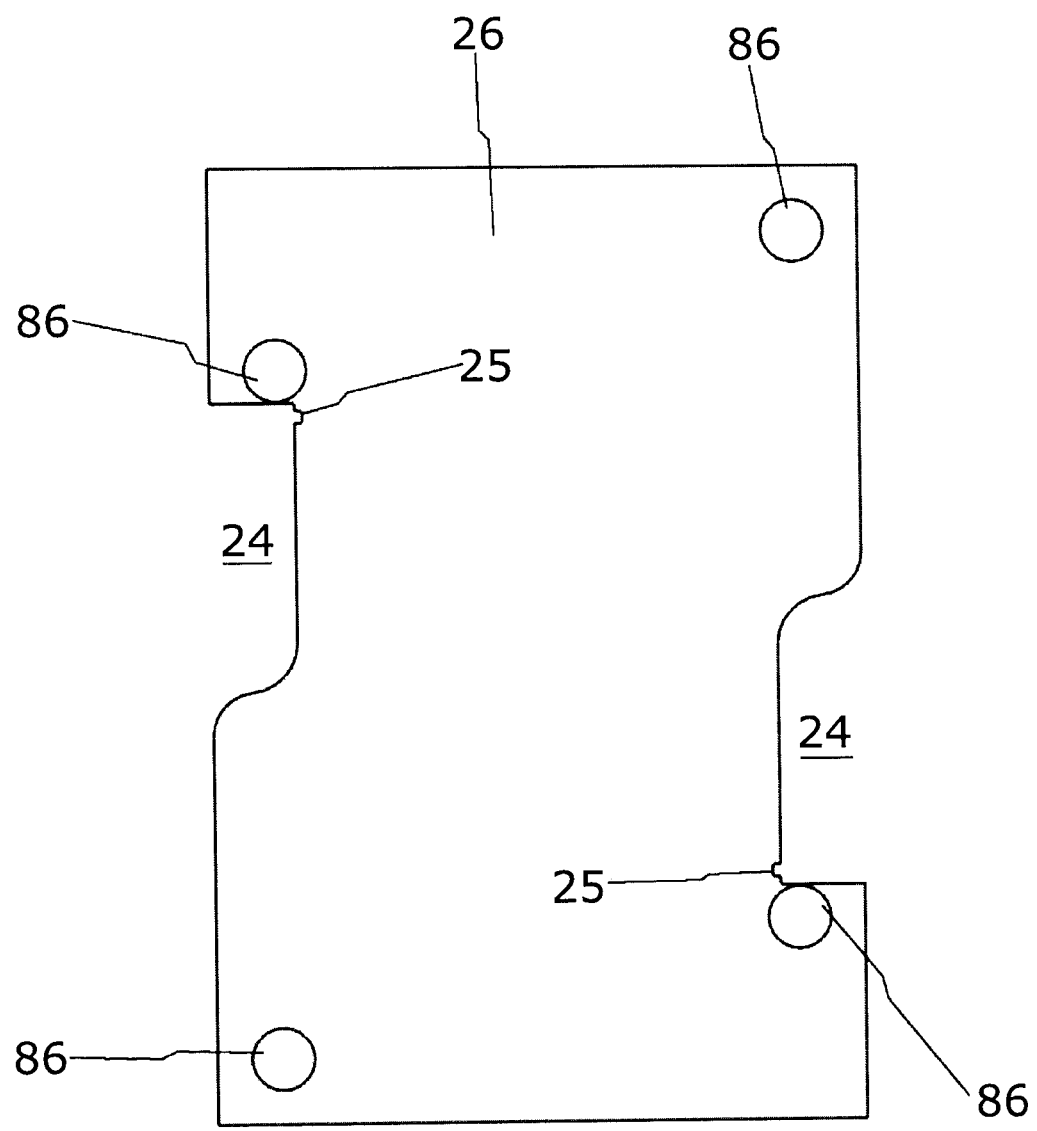
FIG. 12 is a top view of the bottom plate of the fuel cell module of FIG. 5.

FIG. 12 shows a top view of the bottom plate 26. The footprint of the bottom plate 26, as can be seen, corresponds exactly to the footprint of the jacket 22 described with reference to FIG. 11. The alignment regions 28 shown in FIG. 11 are provided with mounting through holes 28 on the bottom plate 26, so that fasteners can be passed through the bottom plate 26 from the outside, across the stack 12 and finally towards the connection area of the lid cap assembly 30. Thus, the fuel cell module 10 can be favorably mounted from the bottom plate 26 by means of four fixation means 68 such as screws to the integration backplane. In the area of the pockets 24, a notch 25 is provided for retention means 27 depicted in FIG. 13.

Figure 13:
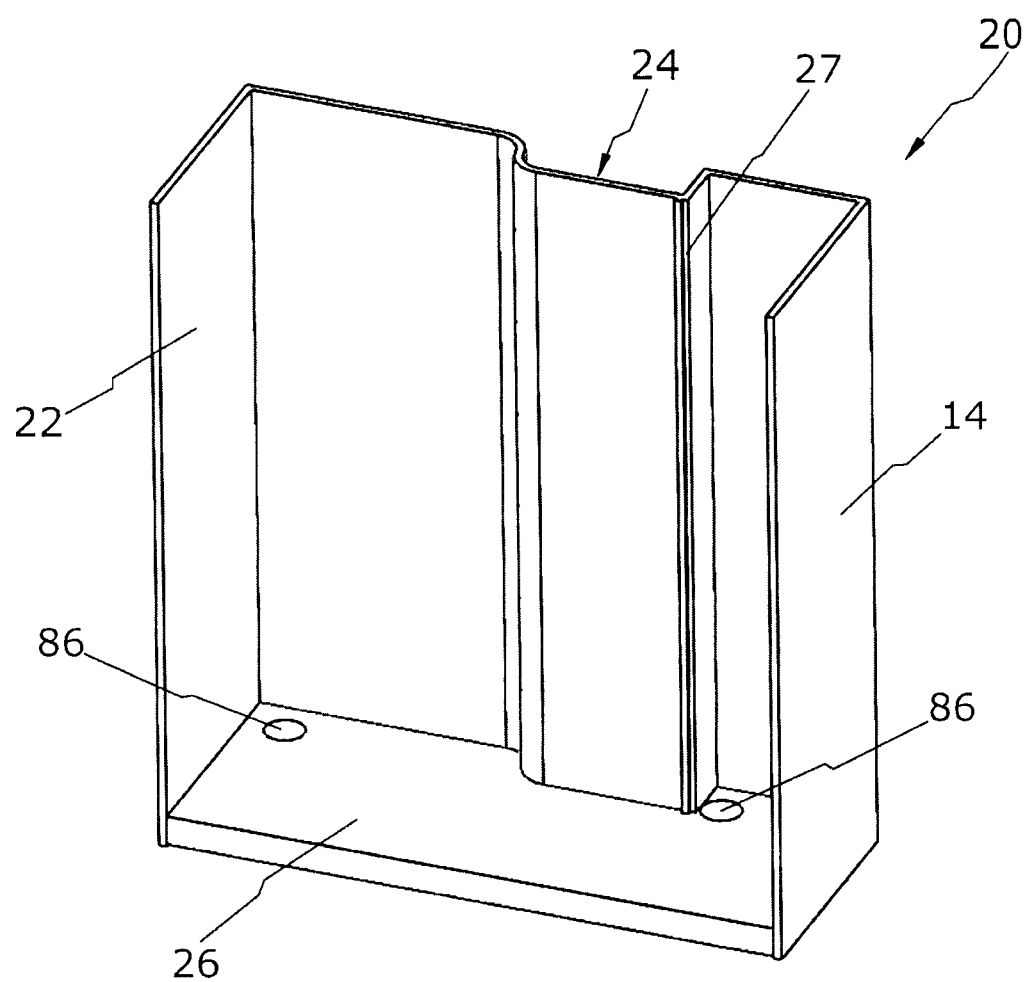
FIG. 13 is a section and perspective view of the bottom assembly of the fuel cell module of FIG. 5.

FIG. 13 shows a cross section of the bottom assembly 20, depicting a section of the jacket 22 and a section of the bottom plate 26. In the embodiment shown in FIG. 13, the bottom plate 26 is welded to the jacket 22 around the circumference. During assembly, the MEAs and bipolar plates are positioned on top of each other, starting from the bottom plate 26.

Current collector tab retention means 27 are provided, the retention means 27 being form-fitted to the notch 25. The retention means 27 provide for alignment to the current collector tab 72 especially during stack assembly.

Figure 14:
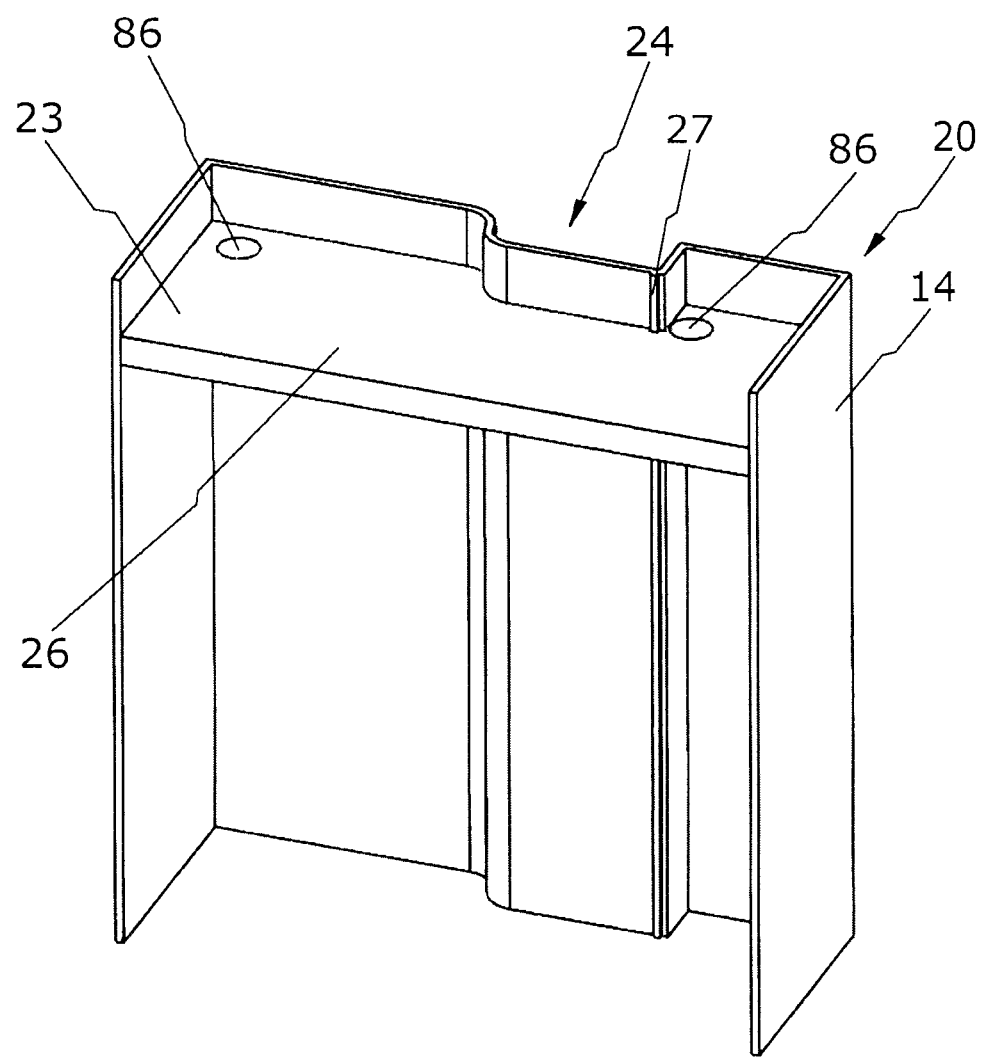
FIG. 14 is a section and perspective view of a bottom assembly of a fuel cell module according to a second embodiment of the invention.

FIG. 14 shows an embodiment different from the one described with regards to FIG. 13. The embodiment in FIG. 14 includes a movable bottom plate 26, which is positioned in the upper area of the jacket 22 at the beginning of stacking of the MEAs and bipolar plates. The movable bottom plate 26 may also be called a center mounting plate 23 in the context of the present disclosure. As the stack grows by assembling, the center mounting plate 23 is moved towards the bottom of the jacket 22, or the jacket 22 is moved relative to the center mounting plate 23, depending on the embodiment. This makes it possible that every MEA or bipolar plate to be stacked can be handled at the same place by the assembling machine such as a robot.

Figure 15:
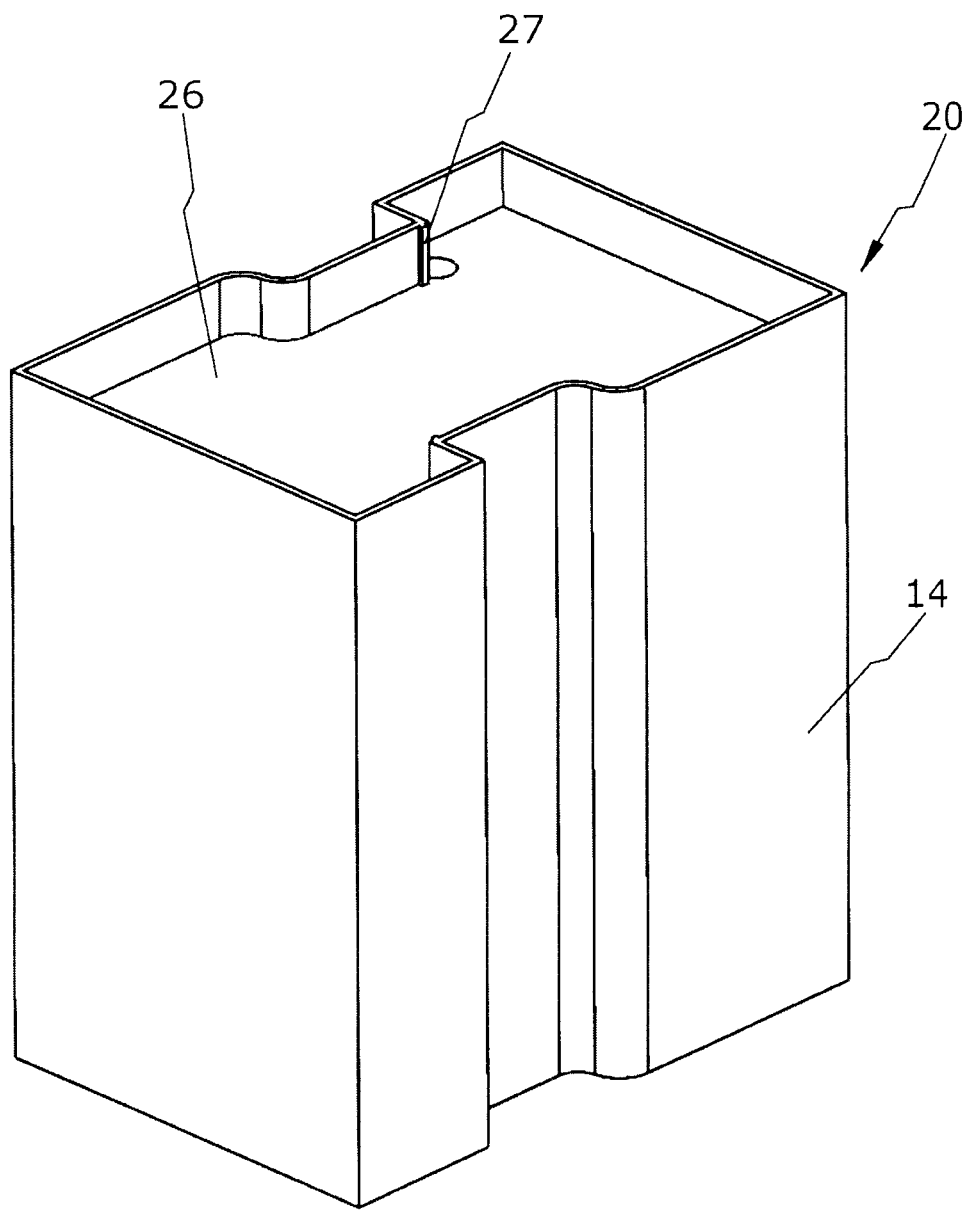
FIG. 15 is a perspective view of the bottom assembly depicted from below.

FIG. 15 shows the situation from below after stacking the entire fuel cell stack 12 in the bottom assembly 20. As can be seen, there may an excess length of the jacket 22 with respect to the bottom plate 26. The excess length may be laser cut and the bottom plate 26 may be welded to the jacket 22 to form the bottom assembly 20.

The technology involving moveable mounting plate 23 enables different stack sizes of the fuel cell modules 10. Once the required stack size of one fuel cell module 10 is reached, the jacket 22 may be laser cut and the next one may readily be assembled. Thus, the production line may be adapted for assembling different stack sizes to fuel cell modules 10 on demand.

Figure 16:
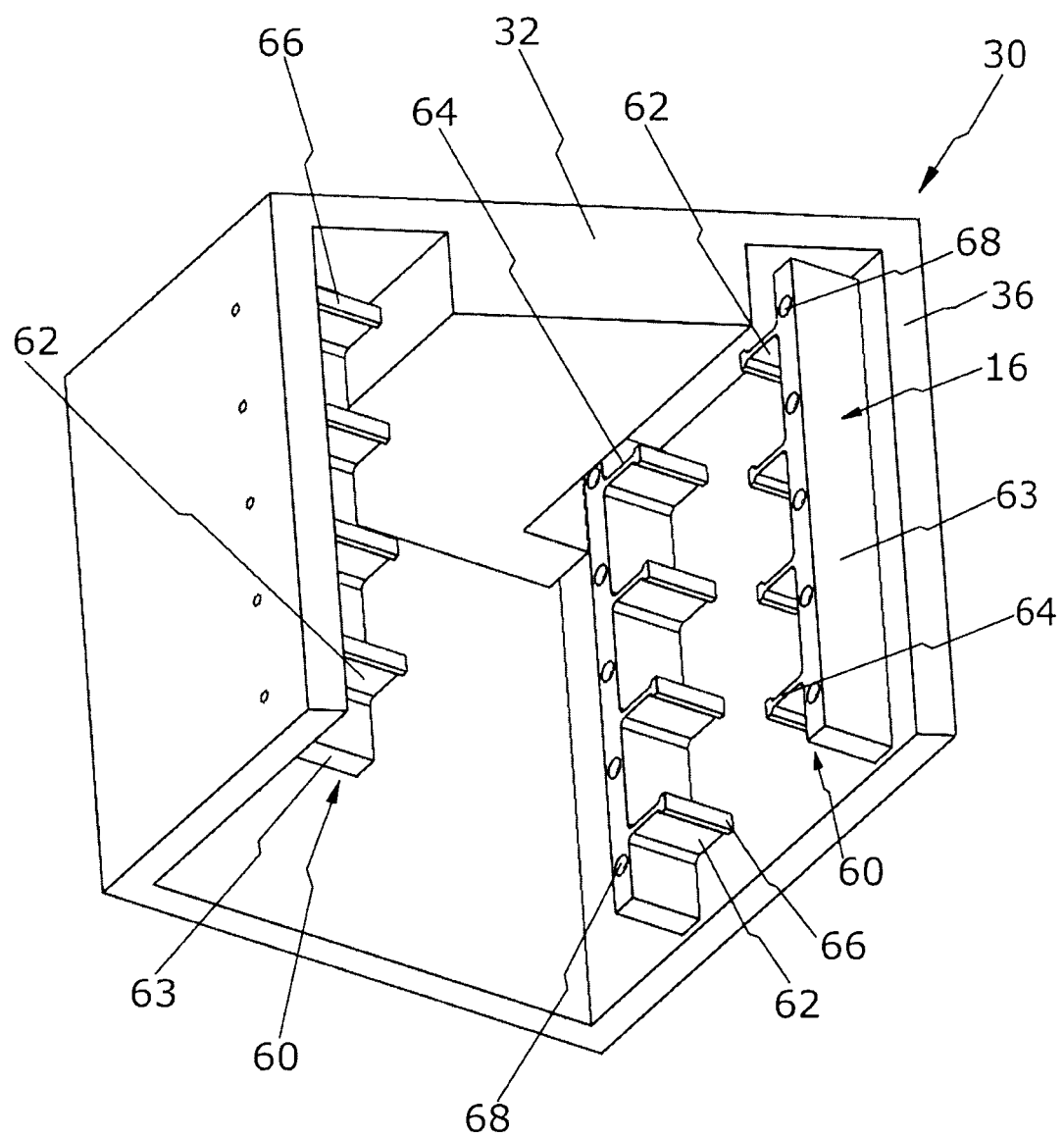
FIG. 16 is a section and perspective view of the lid cap assembly with the ratchet bar of the fuel cell module of FIG. 5.

FIG. 16 shows a perspective view of the lid cap assembly 30 with four ratchet bars 60 attached to the jacket section 36 of the lid cap assembly 30, three of which are depicted. The ratchet bars 60 form part of a locking system 16 for securing the lid cap assembly 30 to the bottom assembly 20 as will be described in more detail below.

The ratchet bars 60 are arranged at a distance from each other. Each ratchet bar 60 in the embodiment shown comprises a second rail 63 with a number of protrusions 62 attached to it. Two ratchet bars 60 are attached to each side of the jacket section 36 so that the protrusions 62 face each other. The protrusions 62 each comprise a sliding portion 64 and a knob portion 66 arranged at a distal end of the sliding portion 64 with regards to the second bar 63.

Figure 17:
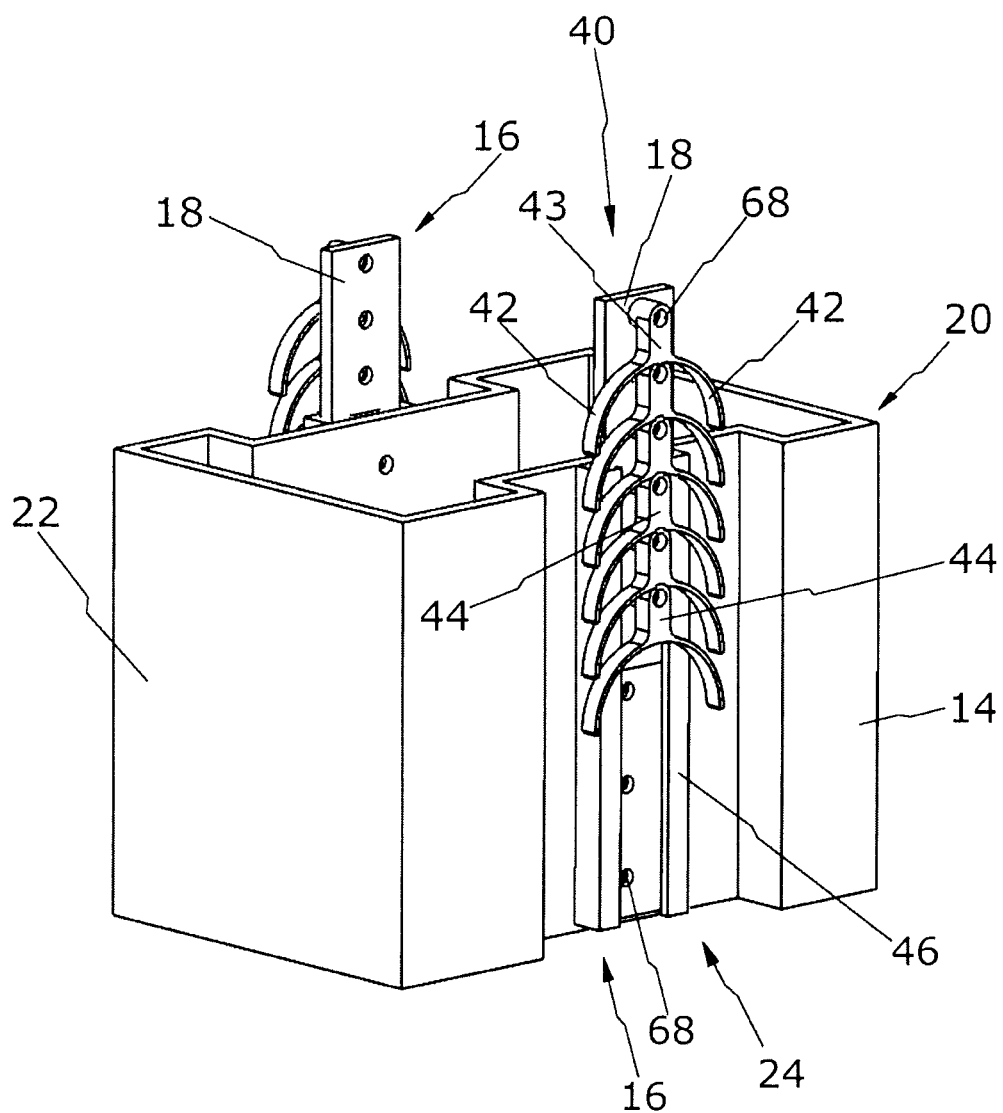
FIG. 17 is a perspective view of the bottom assembly with the leaf spring structure of the fuel cell module of FIG. 5.

FIG. 17 shows the bottom assembly 20 with the jacket 22 and elements of the locking system 16 arranged in the pockets 24. The pockets 24 can be designed as described above, i.e. slightly asymmetrical with respect to the longitudinal axis of the bottom assembly 20 or, alternatively, opposite each other.

In the embodiment shown, the part of the locking system 16 located on the bottom assembly 20 comprises an assembly with a slider 18 and a leaf spring structure 40. The slider 18 is movably arranged in a backdrop guidance 46. The backdrop guidance 46 is attached to the jacket 22 of the bottom assembly 20 by further fixation means 68. The backdrop guidance 46 can be designed as a guide bracket with a C-profile, for example. The technical function of the slider 18 will be described in more detail below.

The leaf spring structure 40 is attached to the slider 18 by means of a series of fixation means 68. In the embodiment shown in FIG. 17, the leaf spring structure 40 comprises a number of leaf springs 44 which can be attached to slider 18, either rigidly or pivotably. This embodiment comprises, for example, six leaf springs 44, each comprising two prongs 42 extending from a fixation portion 43. The prongs 42 are curved towards the bottom plate 26. If the prongs 42 are bent, they absorb elastic energy. During bending or expansion (here: spreading), the prongs builds up a restoring force.

It shall be understood that the elements of the locking system 16 described with regards to FIGS. 16 and 17 can also be provided in mechanical reverse, i.e., leaf spring structure 40 with slider 18 assigned to lid cap assembly 30, and ratchet bars 60 assigned to bottom assembly 20.

Figure 18:
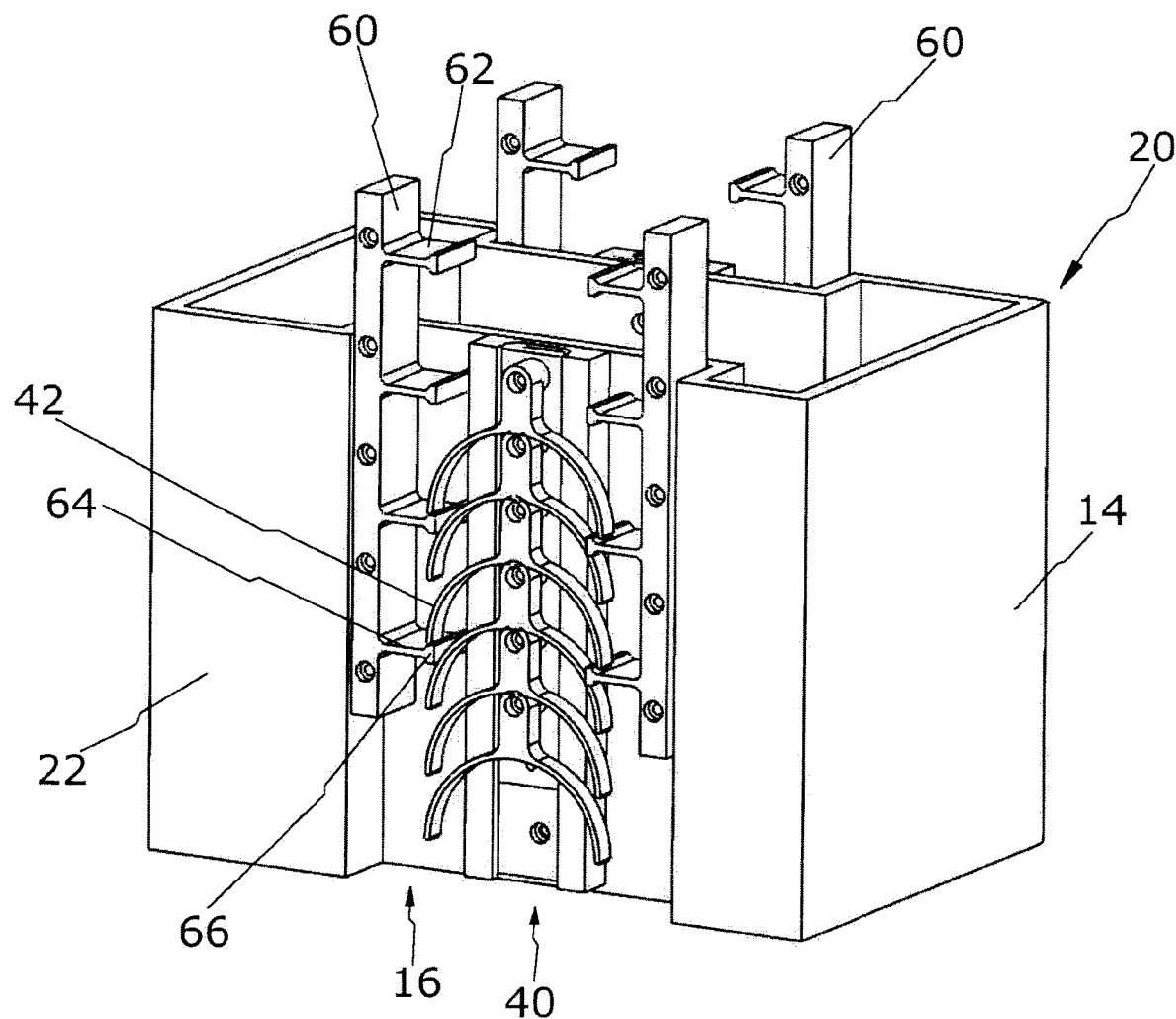
FIG. 18 is a perspective exploded view of the bottom assembly with a leaf spring structure and the ratchet bar of the fuel cell module of FIG. 5.

FIG. 18 schematically shows the interaction of the ratchet bars 60 with the leaf spring structures 40. It should be understood that in this embodiment the ratchet bars 60 are attached to the lid cap assembly 30, which is not shown in FIG. 18 for the sake of clarity. Assembling the bottom assembly 20 with the lid cap assembly 30, the protrusions 62 of the ratchet bar 60 run parallel to the bottom plate 26.

What can be seen is the leaf spring structure 40 and the ratchet bars 60 are dimensionally matched so that when the prongs 42 and the protrusions 62 are brought together, the prongs 42 come behind the knob portions 66 and rest on the sliding portions 64. For example, there may be as many prongs 42 on the leaf spring structure 40 as there are protrusions 62 on the ratchet bar 60. Alternatively, more or fewer prongs 42 than protrusions 62 may be provided.

Figure 19:
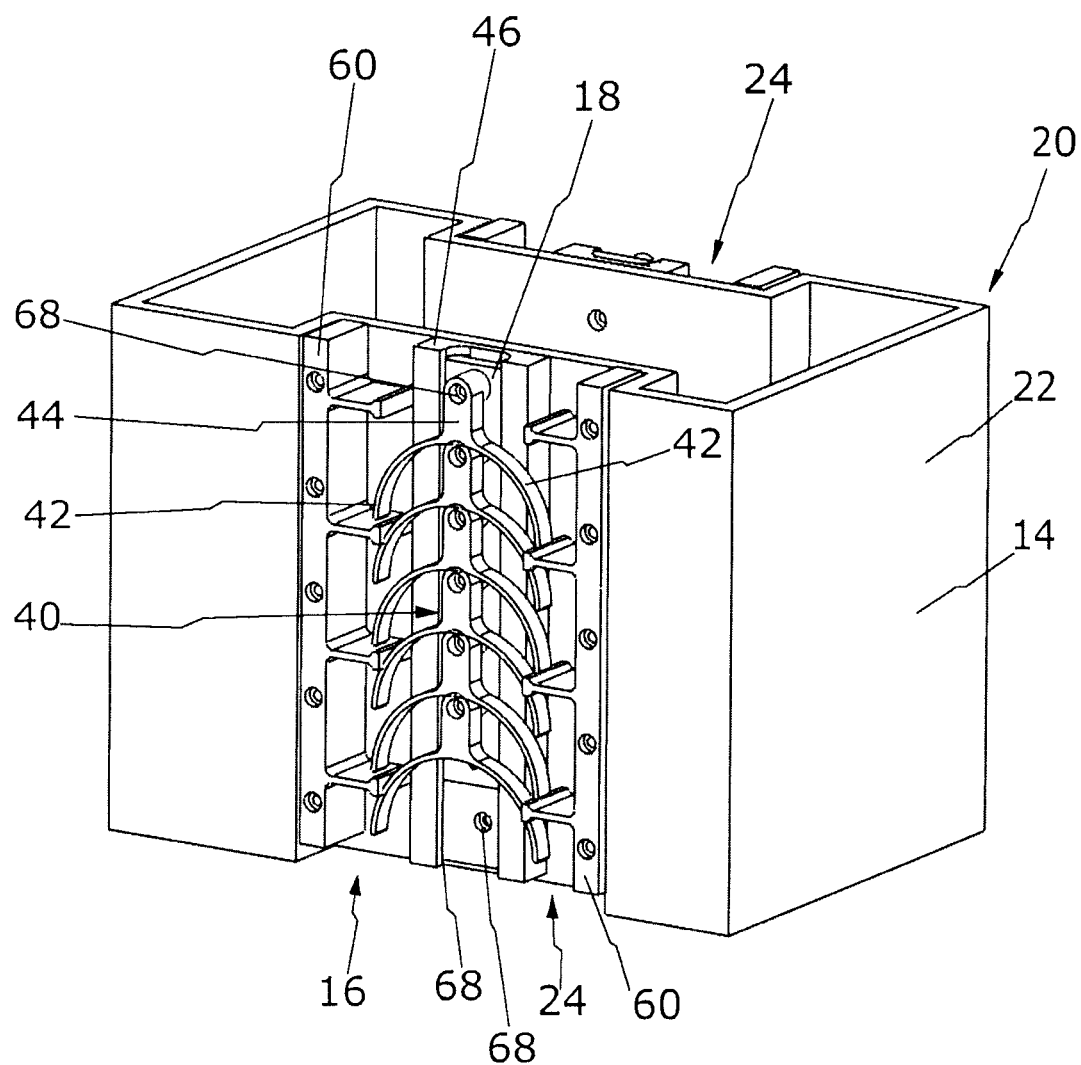
FIG. 19 is a perspective view of the bottom assembly with the leaf spring structure and the ratchet bar of the fuel cell module of FIG. 5.

In practice, after mounting the fuel cell module 10, i.e., after inserting the fuel cell stack 12 into the enclosure 14, the bottom assembly 20 and the lid cap assembly 30 can be moved against each other to build up a pre-compression stage. FIG. 19 shows a first locking position of the locking system 16, wherein such a pre-compression is applied to the stack. At least some of the prongs 42 have come behind the knob portions 66.

If the slider 18 is pushed towards the bottom plate 26, the prongs 42 slide on the sliding portions 64 of the ratchet bar 60. More compression can be built up against the fuel cell stack 12. Moving the slider 18 allows a whole range of compression pressures to be applied to the fuel cell stack 12.

In some embodiments, the slider 18 may be accessed via though holes in the lid cap assembly which are not depicted in the Figures. The slider 18 may be pushed towards the bottom plate 26 by using a tool. The bottom assembly 20 and the lid cap assembly 30 can then be tightened more tightly together to provide full compression to the fuel cell stack 12. Once in position, the slider 18 may be fixated by fixation means from below. The fixation means may be provided as a cable system which ties the location. Alternatively, fixing screws, bolts or welds may be used.

During use, when the chemical reactions take place, the fuel cell stack 12 is subject to swelling or thermal expansion and requires more volume in the stacking direction. The bottom plate 26 and the compression plate 32 are displaced from each other. The leaf spring structure 40 and the ratchet bars 60 are also displaced from each other. The prongs 42 are bent and build up a restoring force which adds up to the pressure in the fuel cell stack 12. In practice, a dynamic volume change of the fuel cell stack 12 during operation can be cushioned by the elastic energy in the locking system 16.

Specifically, the leaf spring structure 40 may be a constant force spring, allowing the physical environment for the chemical reaction to be constant in the fuel cell stack 12, even if its volume grows.

Figure 20:
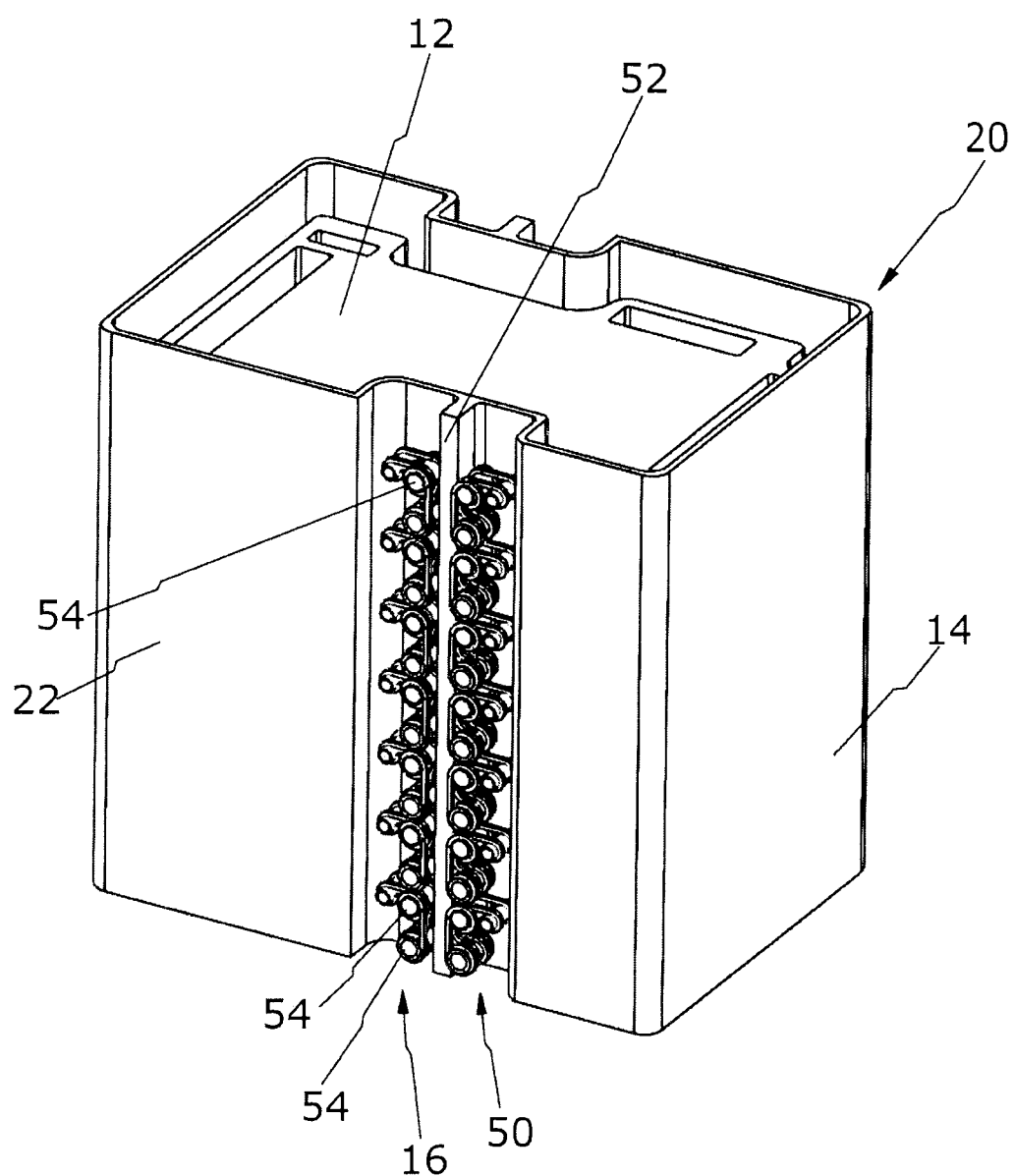
FIG. 20 is a perspective view of a bottom assembly filled with a fuel cell stack and a spring assembly of a fuel cell module according to a third embodiment of the invention.

FIG. 20 shows an alternative embodiment of a locking system 16 with a first rail 52, which is integrally formed with the jacket 22 in the middle of the pocket 24 and a spring assembly 50. In some embodiments, the first rail 52 may be slidably arranged on the jacket 22, in the same manner as described with regards to the slider 18.

To the left and right of the central first rail 52, interconnected cylinder members 54 are shown in FIG. 20, forming a spring assembly 50. The spring members are attached to the lid cap assembly 30, which is not shown in FIG. 20. Displacement of the lid cap assembly 30 in relation to the bottom assembly 20 leads to an increase or decrease of restoring forces, which enable a dynamic pressure adjustment for the fuel cell stack 12.

Figure 21:
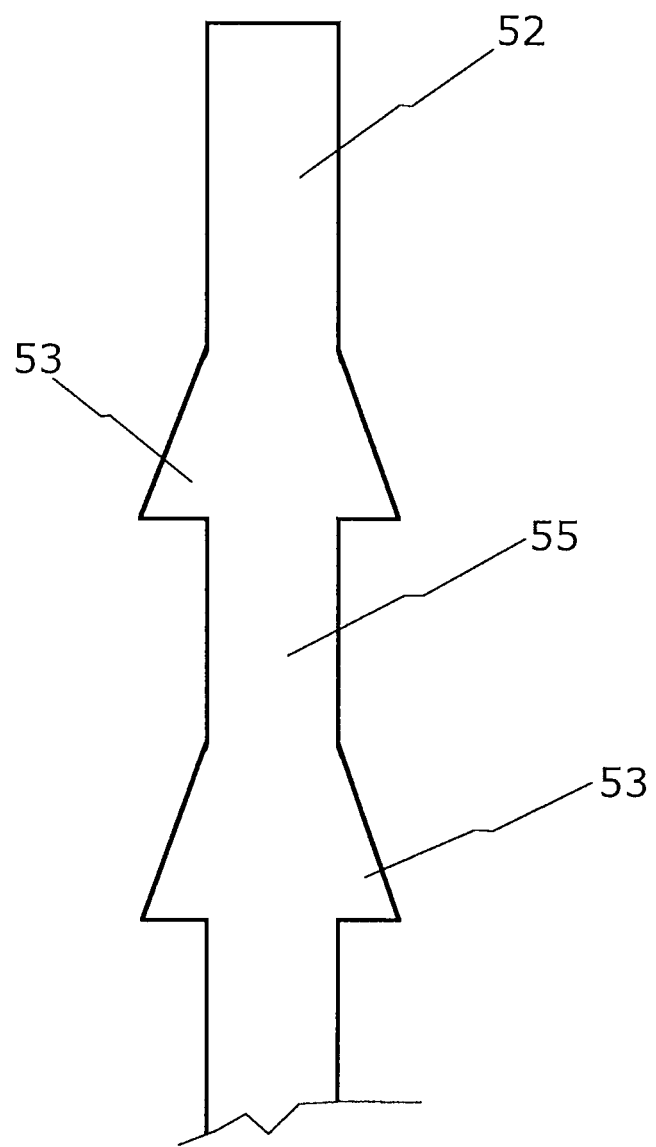
FIG. 21 is a schematic view of the first rail of FIG. 20 with straight sections and wedges.

To this purpose, first rail 52 comprises wedges 53 which are shown in FIG. 21. FIG. 21 shows the first rail 52 having straight sections 55 and wedges 53. Although straight sections 55 are also shown, some embodiments do not require straight sections 55. If the cylinder members 54 are moved over the wedges 53, several locking steps may be facilitated, the locking steps providing pre-compression and full compression to the fuel cell stack 12.

LIST OF REFERENCE SIGNS

10 fuel cell module
12 fuel cell stack
13 footprint of fuel cell stack
14 enclosure
16 locking system
18 slider
20 bottom assembly
22 jacket
23 center mounting plate
24 pocket
25 notch
26 bottom plate
27 retention means
28 alignment region
30 lid cap assembly
32 compression plate
34 media routing channel
36 jacket section
38 slot section
40 leaf spring structure
42 prong section
43 central portion
44 leaf spring
46 backdrop guidance
50 spring assembly
52 first rail
53 wedge
54 spring member
55 straight section
60 ratchet bar
62 protrusion
63 second rail
64 sliding portion
65 knob portion
66 fixation means
68 external connection means
70 through hole
71 current collector tab
72 end plate
73 oxidant inlet
74 oxidant outlet
76 coolant port
78 fuel inlet
80 fuel outlet
81 ejector valve access window
82 purge valve access window
84 mounting through hole

The invention claimed is:
1. A fuel cell module
   having a plurality of fuel cells forming a fuel cell stack, and having an enclosure which surrounds the fuel cell stack, wherein the enclosure includes a bottom assembly and a lid cap assembly, wherein the bottom assembly includes a jacket at least partly form-fitted to the stack architecture providing internal alignment functions and a bottom plate in pressure contact with the fuel cell stack, wherein the lid cap assembly comprises a compression plate in pressure contact with the fuel cell stack, wherein the bottom assembly and the lid cap assembly are provided with a progressive locking system providing a range of compression pressures to the fuel cell module, characterized in that the progressive locking system provides for an upbuilding of restoring forces through the displacement of the bottom assembly in relation to the lid cap assembly when the fuel cell stack grows during use and requires more volume in the stacking direction.

2. The fuel cell module as claimed in claim 1,
wherein the progressive locking system provides for several locking steps, wherein at least one locking step provides pre-compression and at least one other locking step provides full compression to the fuel cell stack.

3. The fuel cell module as claimed in claim 1,
wherein the lid cap assembly includes a circumferential jacket section for a form-fitted engagement with the jacket and wherein the progressive locking system comprises first locking elements formed at the jacket section.

4. The fuel cell module as claimed in claim 1,
wherein the progressive locking system comprises a spring structure, preferably a leaf spring structure, provided at one of the lid cap assembly and the jacket, and wherein the spring structure engages a ratchet bar provided at the other one of the lid cap assembly and the jacket.

5. The fuel cell module as claimed in claim 4,
wherein one of the spring structure and the ratchet bar is arranged on a slider providing the ability of adjusting compression pressures to the fuel cell module.

6. The fuel cell module as claimed in claim 4,
wherein the ratchet bar includes a number of protrusions having sliding portions, and wherein a displacement of the lid cap assembly with regards to the bottom assembly translates into a sliding movement of at least one leaf spring of the leaf spring structure over a sliding portion.

7. The fuel cell module as claimed in claim 1,
wherein the progressive locking system comprises a spring assembly provided at one of the lid cap assembly and the jacket, and wherein the spring assembly engages a first rail provided at the other one of the lid cap assembly and the jacket.

8. The fuel cell module as claimed in claim 1,
wherein the jacket has a rectangular cross section with pockets, and wherein the pockets provide a space for housing the progressive locking system.

9. The fuel cell module as claimed in claim 1,
wherein the jacket provides for at least three, preferably at least four alignment regions for stack alignment during assembling and wherein at least one, preferably two, three or four of these alignment regions form mounting through holes for the connection of the fuel cell module to an external support structure.

10. The fuel cell module as claimed in claim 1,
comprising humidification means, sensors and/or controllers for monitoring the operation of the fuel cell module and/or power conversion devices, integrated into the enclosure.

11. The fuel cell module as claimed in claim 1,
wherein the enclosure is box shaped and wherein the lid cap assembly comprises external connection means for supply and evacuation of compressed air, reactants and coolant to the fuel cell module, wherein the external connection means are arranged at the same side of the box shaped enclosure.

12. The fuel cell module as claimed in claim 11,
wherein the fuel cell stack is connected to current collector tabs, and wherein the current collector tabs exit the enclosure at the same side as the external connection means.

13. A fuel cell system having at least one, preferably from 2 to 20 fuel cell modules as claimed in claim 1,
the fuel cell modules being connected to an integration backplane having a distribution system for the supply and evacuation of compressed air, reactants and coolant to the fuel cell modules, and/or for providing current collection of the fuel cell modules.

14. A method for producing a fuel cell module as claimed in claim 1, the method comprising the following steps:
stacking a multitude of MEA units and bipolar plates on a moveable center mounting plate surrounded by the jacket, the movable center mounting plate providing motion so that the jacket provides alignment during the stacking, raising the jacket or lowering the center mounting plate as the height of the stacked MEAs and bipolar plates increases during the assembly process, locking the center mounting plate in position when it meets fixation points with the aligning jacket, the center mounting plate and the jacket thus forming the bottom assembly, and joining the lid cap assembly to the bottom assembly via the progressive locking system to form the enclosure surrounding the fuel cell stack.

\* \* \* \* \*